(12) United States Patent
Weber et al.

(10) Patent No.: US 10,066,121 B2
(45) Date of Patent: Sep. 4, 2018

(54) TWO-PART POLYURETHANE EROSION RESISTANT COATINGS

(71) Applicant: 3M INNOVATIVE PROPERTIES COMPANY, Saint Paul, MN (US)

(72) Inventors: Björn Weber, Hamm (DE); Frans A. Audenaert, Kaprijke (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/568,037

(22) PCT Filed: Apr. 18, 2016

(86) PCT No.: PCT/US2016/028028
§ 371 (c)(1),
(2) Date: Oct. 20, 2017

(87) PCT Pub. No.: WO2016/172016
PCT Pub. Date: Oct. 27, 2016

(65) Prior Publication Data
US 2018/0142122 A1 May 24, 2018

Related U.S. Application Data

(60) Provisional application No. 62/152,295, filed on Apr. 24, 2015.

(51) Int. Cl.
| | | |
|---|---|---|
| *B05D 3/10* | (2006.01) | |
| *C08G 18/32* | (2006.01) | |
| *C09D 175/04* | (2006.01) | |
| *F01D 5/28* | (2006.01) | |
| *C08G 18/38* | (2006.01) | |
| *C08G 18/12* | (2006.01) | |
| *C08G 18/87* | (2006.01) | |

(52) U.S. Cl.
CPC ........... *C09D 175/04* (2013.01); *B05D 3/108* (2013.01); *C08G 18/12* (2013.01); *C08G 18/3812* (2013.01); *C08G 18/3857* (2013.01); *C08G 18/3861* (2013.01); *C08G 18/3872* (2013.01); *C08G 18/87* (2013.01); *F01D 5/288* (2013.01)

(58) Field of Classification Search
CPC ............ C08G 18/3812; C08G 18/3861; C08G 18/3872; C09D 175/12; F01D 5/228
See application file for complete search history.

(56) References Cited

U.S. PATENT DOCUMENTS

| | | | |
|---|---|---|---|
| 3,787,351 A | 1/1974 | Olson | |
| 4,540,765 A * | 9/1985 | Koemm | C08G 18/10 427/176 |
| 5,254,660 A | 10/1993 | Kirchmeyer | |
| 5,753,568 A | 5/1998 | Shimano | |
| 6,001,923 A | 12/1999 | Moncur | |
| 2002/0161123 A1 | 10/2002 | Li | |
| 2014/0093738 A1 | 4/2014 | Bimanand | |
| 2014/0170917 A1 | 6/2014 | Jariwala | |
| 2015/0096969 A1 | 4/2015 | Uprety | |

FOREIGN PATENT DOCUMENTS

CN 101550313 A * 10/2009

OTHER PUBLICATIONS

Machine translation of CN 101550313A (Year: 2009).*
International Search Report for PCT/US2016/028028 dated Jul. 15, 2016.

* cited by examiner

*Primary Examiner* — Ramsey E Zacharia
(74) *Attorney, Agent, or Firm* — Eric D. Levinson

(57) ABSTRACT

The present disclosure relates to two-part polyurethane coatings having excellent erosion resistance and comprising a compound having a fluorinated segment. Additionally, these two-part polyurethane coatings can be cured under high relative humidity conditions. The present disclosure also relates to articles coated with those two-part polyurethane coatings and to methods of reducing erosion in an article, among other embodiments.

11 Claims, 2 Drawing Sheets

TWO-PART POLYURETHANE EROSION RESISTANT COATINGS

CROSS REFERENCE TO RELATED APPLICATIONS

This application is a national stage filing under 35 U.S.C. 371 of International Application No. PCT/US2016/028028, filed Apr. 18, 2016, which claims the benefit of U.S. Provisional Application No. 62/152,195, filed Apr. 24, 2015. The disclosures of both applications are incorporated by reference in their entirety herein.

The present disclosure relates to fluorinated two-part polyurethane coatings having excellent erosion resistance and comprising a compound having a fluorinated segment. Additionally, these two-part polyurethane coatings can be cured under high relative humidity conditions. The present disclosure also relates to articles coated with those two-part polyurethane coatings and to methods of reducing erosion in an article, among other embodiments.

BACKGROUND

Rotor blades, such as those in a helicopter, blades of wind turbines and the like, are subject to erosion caused by the impact of airborne material, such as rain, sand, dust, and other debris. The leading edge of a rotor blade is particularly prone to damage by erosion. Examples of other articles used outdoors subject to erosion include train underfloors and certain portions of the fuselage or a wing of an aircraft.

The industry has sought ways of protecting against such erosion by means of, for example, protective tapes or films. However, the application of tapes or films on, for instance, rotor blades, cannot be easily automated and is typically done by hand. That process can be time-consuming, especially when applying films to blades of large dimensions, as may be the case for those in wind turbines, whose blades may have a length greater than 30 m, or even greater than 60 m. The next generation of wind rotor blades are expected to have lengths of more than 100 m.

The present inventors propose that two-part polyurethane coatings comprising an isocyanate composition (part A) and a hydroxyl composition (part B) may be used as erosion-protection materials. Normally, two-part polyurethane coatings are very sensitive to high relative humidity during curing because the isocyanate composition reacts with water, which results in a loss of performance. This lower performance often leads to limitations in the areas in which those polyurethane coatings can be used.

For that reason, two-part polyurethane coatings are often only used in environments where humidity and temperature are controlled or where a drop in performance is accounted for and calculated into the application. In certain industries, such as the wind industry, it is not possible to control the humidity and temperature during the application of the polyurethane coating, and a drop in performance cannot be allowed. In those circumstances, manufacturers may need to wait until the environmental humidity is within an acceptable range before coating blades with two-part polyurethane materials.

In operations & maintenance situations, where turbine blades have to be repaired in the field, the repairs may need to wait until weather conditions are suitable or the repair may need to be done outside of the application window, which would result in poor material performance.

Thus, there is a need in the art for two-part polyurethane coatings that can be applied under high humidity conditions, without displaying unacceptable performance losses. Such two-part polyurethane coatings are disclosed in some embodiments of the present application.

SUMMARY

The present inventors have discovered that the use of certain fluorinated hydroxy compounds in two-part polyurethane compositions decreases the sensitivity of those compositions to high humidity during curing. The resulting two-part polyurethane coatings can be applied under environmental conditions that have hitherto not been possible without suffering from unacceptable performance losses. The cured two-part polyurethane coatings of the present disclosure have outstanding performance against erosion, as well as excellent weather resistance, durability, and suitable adhesion to different substrates, among other advantages.

Many articles subject to environmental conditions that generate erosion can benefit from the coatings of the present disclosure, such as helicopter rotor blades, blades of wind turbines, train underfloors, and certain portions of the fuselage or a wing of an aircraft, among others. For ease of description, the following disclosure will refer to wind turbines or the wind industry when exemplifying the two-part polyurethane coatings disclosed herein, as well as their use, preparation, properties, etc. However, it should be understood that the present disclosure is equally applicable to other items susceptible to environmental erosion that can serve as a substrate for two-part polyurethane coatings.

The polyurethane coatings of the present disclosure are called two-component (2K) compositions because they are formed by combining an isocyanate composition with a hydroxyl composition. The initial mixing of the two compositions forms a precursor composition (uncured mixed coating precursor composition), wherein, during curing, the isocyanate functional components in the isocyanate composition react with the hydroxyl-functional components in the hydroxyl composition to provide the cured coating composition. This means the isocyanate composition and the hydroxyl composition are kept separated from each other and are only combined to form a coating precursor composition prior to their application onto the substrate to be coated.

In addition to other hydroxyl-functional components, the hydroxyl composition comprises a fluorinated alcohol, which may be a fluorinated mono alcohol (i.e. having a single hydroxyl moiety per molecule) or may be a fluorinated diol (i.e. having two hydroxyl moieties per molecule). The coating compositions provided herein thus comprise, or are the product of the reaction of, the isocyanate composition with the hydroxyl composition, including the fluorinated alcohol. Suitable isocyanate-functional compositions and suitable hydroxyl-functional compositions will be described in greater detail below.

The present inventors discovered that the use of certain fluorinated alcohols allows curing of the coating precursor composition at high humidity values, without adversely affecting the erosion protection properties of the coatings.

The present inventors found out that, contrary to initial expectations, the polyurethane coatings of this disclosure exhibited favorable rain erosion properties although they contained essentially no cross-linking (e.g., cross-linking due to the presence of isocyanate and/or hydroxyl molecules with a functionality higher than 2 in the two-part composition).

All scientific and technical terms used herein have meanings commonly used in the art unless otherwise specified.

The definitions provided herein are to facilitate understanding of certain terms used frequently in this application and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "organic linking group" as used herein refers to any organic moiety that forms covalent bonds with at least two other moieties or organic groups. Examples of organic linking groups include: —$CH_2$—, —$CH_2CH_2$—, —$SO_2$—N(Me)$CH_2CH_2$—, —C(O)—N(H)$CH_2CH_2$—, —CH<, —$CH_2$CH<, —$SO_2$—N(Me)$CH_2$CH<, and —C(O)—N(H)$CH_2$CH<.

The term "elongation at break point" as used herein refers to the value of the tensile elongation at break point of a free film reported in percentage points when measured according to ASTM D882-10. In the inventors' experience, the thickness of the free film does not significantly influence the value of the elongation at break point when the film is from 300 μm to 500 μm thick.

The term "rain erosion resistance" as used herein refers to the number of hours a given sample of a thickness of about 300 microns coated on the leading edge of a substrate, mounted on the blades of a rotor, shows no erosion under simulated rain conditions according to ASTM G73-10. As used herein, "no erosion" refers to the absence of break through in the polyurethane coating, even though a portion of the coating may have been partially eroded. That is, as long as no portion of the surface of the substrate on which the polyurethane coating was applied is exposed, the sample shows no erosion in this test. A portion of the surface of the substrate is exposed when there is no polyurethane coating left on a given area of the surface that has been subjected to the simulated rain conditions.

The term "tensile strength at break" as used herein refers to the value of tensile strength at break measured according to ASTM D882-10.

The term "($C_1$-$C_{20}$) alkyl" as used herein refers to an alkyl chain of 1 to up to 20 carbon atoms in length. The alkyl chain may be linear, cyclic or branched. Examples of ($C_1$-$C_{20}$) alkyl include methyl, ethyl, propyl, isopropyl, butyl, isobutyl, tert-butyl, pentyl, hexyl, heptyl, octyl, decyl, undecyl, cyclohexyl and octadecyl.

The term "($C_1$-$C_6$) alkyl" as used herein refers to an alkyl chain of 1 to up to 6 carbon atoms in length. The alkyl chain may be linear, cyclic or branched. Examples of ($C_1$-$C_6$) alkyl include methyl, ethyl, propyl, isopropyl, butyl, isobutyl, tert-butyl, pentyl, hexyl, and cyclohexyl.

The term "perfluorinated alkyl" as used herein refers to an alkyl chain of 1 to 4 carbon atoms in length wherein all H atoms are replaced with F.

The term "perfluorinated alkylene group" as used herein refers to and alkylene chain wherein all H atoms are replaced with F.

The term "perfluorinated polyalkyleneoxy" as used herein refers to polyalkyleneoxy chain wherein all H atoms are replaced with F.

The term "fluorinated segment" as used herein refers to a portion of a molecule that comprises one or more fluorine atoms covalently bonded to a carbon atom.

DETAILED DESCRIPTION

Figure 1:
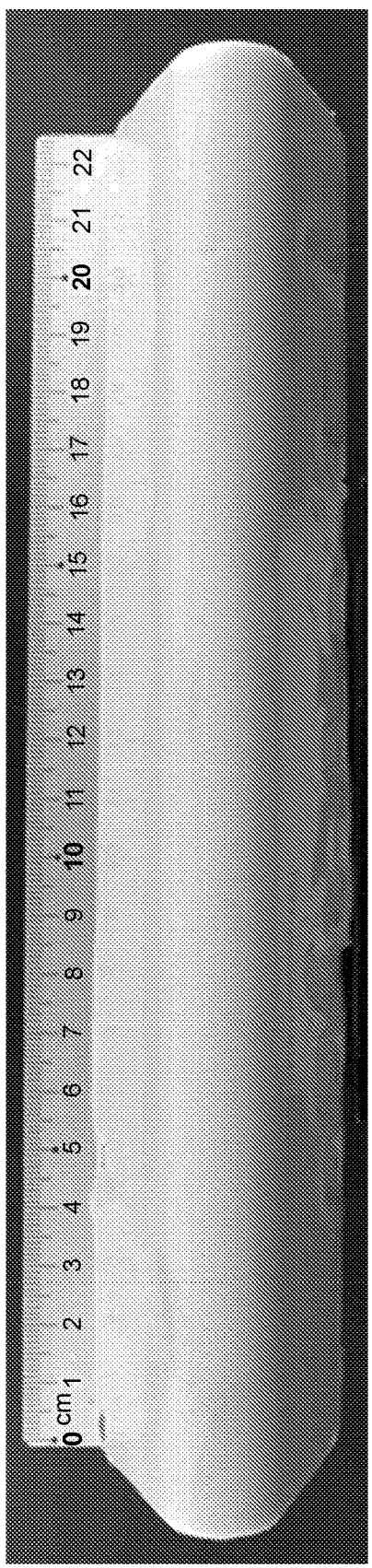
FIG. 1 is a picture showing the results of a rain erosion test (18 h) on a specimen coated with the coating from Example 3, cured at 80% RH and 23° C. for 24 h followed by 6 days at 50% RH and 23° C.

In one embodiment, the present disclosure is directed to a two part composition comprising:
an isocyanate composition comprising polyisocyanate molecules, each molecule having two or more isocyanate moieties;
wherein from 95% to 100% of the polyisocyanate molecules have two isocyanate moieties each and from 0% to 5% of the polyisocyanate molecules have three or more isocyanate moieties each; and
a hydroxyl composition comprising:
polyol molecules, each molecule having two or more hydroxyl moieties;
wherein from 95% to 100% of the polyol molecules have two hydroxyl moieties each and from 0% to 5% of the polyol molecules have three or more hydroxyl moieties each; and
a fluorinated alcohol comprising a fluorinated segment, wherein the fluorinated segment (Rf) has a formula molecular weight of less than 1000 g/mole; wherein the fluorinated alcohol has the formula:

wherein: X is an organic linking group;
Rf represents a monovalent or divalent perfluoroaliphatic group, comprising a (per)fluorinated alkyl or alkylene group, optionally in combination with perfluorinated polyalkyleneoxy groups consisting of perfluorinated alkyleneoxy groups having 1, 2, 3 or 4 carbon atoms or a mixture of such perfluorinated alkyleneoxy groups a is 1 or 2,
wherein, when a=1 then R1 is —OH or —H and,
wherein, when a=2 then R1 is H and
wherein the two-part composition, when mixed, coated on a substrate, and cured, has a rain erosion resistance longer than 9 hours measured according to method ASTM G73-10 using a coating of about 300 µm.

In another embodiment, the present disclosure is directed to a fluoro diol-containing two-part composition comprising:
an isocyanate composition comprising polyisocyanate molecules, each molecule having two or more isocyanate moieties;
wherein from 95% to 100% of the polyisocyanate molecules have two isocyanate moieties each and from 0% to 5% of the polyisocyanate molecules have three or more isocyanate moieties each; and
a hydroxyl composition comprising:
polyol molecules, each molecule having two or more hydroxyl moieties;
wherein from 95% to 100% of the polyol molecules have two hydroxyl moieties each and from 0% to 5% of the polyol molecules have three or more hydroxyl moieties each; and
a fluoroalkyl sulfonamido alcohol of the formula:

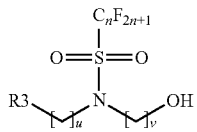

wherein: n is an integer from 1 to 16;
u is an integer from 1 to 20;
v is an integer from 1 to 20, and
R3 is —OH or —H;
wherein the two-part composition, when mixed, coated on a substrate, and cured, has a rain erosion resistance longer than 9 hours measured according to method ASTM G73-10 using a coating of about 300 µm.

In other embodiments, the fluoroalkyl sulfonamido alcohol is a fluoroalkyl sulfonamido diol of the formula:

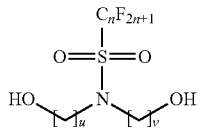

wherein: n is an integer from 1 to 16;
u is an integer from 1 to 20; and
v is an integer from 1 to 20
In other embodiments, the two-part composition, when mixed, cured, and made into a free film, forms a polyurethane film having an elongation at break point higher than 300% according to method ASTM D882-10 and measured on a film having a thickness of 300 µm to 500 µm.

Without wishing to be bound by theory, the inventors believe that reducing or eliminating cross-linking when curing the two-part polyurethane coatings improves the mechanical properties that are responsible for the superior erosion resistance of the polyurethane coatings disclosed herein. For that reason, in certain embodiments, the isocyanate functional materials are difunctional and the isocyanate-reactive materials (such as, for example, hydroxyl materials) are also difunctional. However, in other embodiments, a certain fraction of the isocyanate functional materials, and/or a certain fraction of the isocyanate-reactive materials have a functionality greater than two (i.e., have three or more isocyanate moieties per molecule and/or three or more isocyanate-reactive moieties (such as hydroxyl moieties) per molecule). In other embodiments, the two-part composition, when mixed, cured, and made into a free film, forms a polyurethane film capable of being dissolved in organic solvents, such as acetone, which is an indication that the cured polyurethane coatings have little to no crosslinking.

In some embodiments, the isocyanate and hydroxyl precursor compositions have each greater than 90% difunctional isocyanate and hydroxyl molecules respectively, such that the final cured coating had limited or no cross-linking due to isocyanate or hydroxyl molecules with a functionality higher than 2.

In certain embodiments, the isocyanate and hydroxyl precursor compositions have each greater than 95% difunctional isocyanate and hydroxyl molecules respectively, and in other embodiments, the isocyanate and hydroxyl precursor compositions have each greater than 98% difunctional isocyanate and hydroxyl molecules respectively, or greater than 99% difunctional isocyanate and hydroxyl molecules respectively, or even 100% difunctional isocyanate and hydroxyl molecules (with no isocyanate or hydroxyl molecules of a functionality greater than two).

In certain embodiments, the polyurethane coatings of the present disclosure (when the two-part composition is mixed, cured, and made into a free film, forming a polyurethane film) are highly elastic, for example having an elongation at break when made into a free film of at least about 300% when measured according to method ASTM D882-10. In other embodiments, the coatings have an elongation at break of at least about 350%, or 400%, or 450%, or 500%, or 550%, or 600%, or 650%, or 700%, or 750%. In those embodiments, the polyurethane coatings continue to exhibit those elongation at break values even if the coatings were initially cured at temperatures lower than 25° C., such as 23° C., and under high relative humidity (RH) values, such as 60% RH (or higher than 60%), 65% RH (or higher than 65%), or 70% RH (or higher than 70%), or 75% RH (or higher than 75%), or even at 80% RH (or higher than 85%).

In other embodiments, however, high elasticity by itself would not necessarily reflect a superior coating. In certain embodiments, the polyurethane coatings of the present disclosure display sufficient tensile strength at break. In other embodiments, the coatings (when the two-part composition is mixed, cured, and made into a free film, forming a polyurethane film) have a tensile strength at break of at least 16 Mpa when measured according to ASTM D882-10. In certain embodiments, the coatings favorably have a tensile strength at break of up to 40 MPa, for example from 16 MPa to 40 MPa, or 16 MPa to 35 MPa, or 20 MPa to 35 MPa, or 25 MPa to 35 MPa, or 30 MPa to 35 MPa. In other embodiments, the coatings favorably have a tensile strength at break of up to 50 MPa, for example from 10 MPa to 50 MPa, or 15 MPa to 50 MPa, or 20 MPa to 50 MPa, or 25

MPa to 50 MPa, or 30 MPa to 50 MPa, or 35 MPa to 50 MPa, or 40 MPa to 50 MPa, or 45 MPa to 50 MPa. In those embodiments, the polyurethane coatings continue to exhibit those tensile strength at break values even if the coatings were initially cured at temperatures lower than 25° C., such as 23° C., and under high relative humidity (RH) values, such as 60% RH (or higher than 60%), 65% RH (or higher than 65%), or 70% RH (or higher than 70%), or 75% RH (or higher than 75%), or even at 80% RH (or higher than 85%).

In other embodiments, the coatings (when the two-part composition is mixed, cured, and made into a free film, forming a polyurethane film) have a tear resistance from 35 N/mm to 70 N/mm, measured according to DIN ISO 34-1 (Jan. 7, 2005), method A (Trouser specimen). In other embodiments, the tear resistance is from 45 N/mm to 70 N/mm, or from 55 N/mm to 70 N/mm. In those embodiments, the polyurethane coatings continue to exhibit those tensile strength at break values even if the coatings were initially cured at temperatures lower than 25° C., such as 23° C., and under high relative humidity (RH) values, such as 60% RH (or higher than 60%), 65% RH (or higher than 65%), or 70% RH (or higher than 70%), or 75% RH (or higher than 75%), or even at 80% RH (or higher than 85%).

In some embodiments, the two-part composition, when mixed, coated on a substrate, and cured, has a rain erosion resistance longer than 9 hours, measured according to method ASTM G73-10 (rotor blade test). In other embodiments, the rain erosion resistance is longer than 10 hours, or longer than 11 hours, or longer than 12 hours, or longer than 13 hours, or longer than 14 hours, or longer than 15 hours, or longer than 16 hours, or longer than 17 hours, or longer than 18 hours. In those embodiments, the polyurethane coatings continue to exhibit those rain erosion resistance values even if the coatings were initially cured at temperatures lower than 25° C., such as 23° C., and under high relative humidity (RH) values, such as 60% RH (or higher than 60%), 65% RH (or higher than 65%), or 70% RH (or higher than 70%), or 75% RH (or higher than 75%), or even at 80% RH (or higher than 85%).

The following components of the coatings and its precursor composition are provided herein as guidance to prepare precursor compositions that will cure to coating compositions having the desired mechanical properties described above. However, it may be possible to use other combinations to provide coatings with the same properties.

Hydroxyl Composition

The hydroxyl composition may contain one or more materials ("isocyanate-reactive materials") that can react with isocyanate functional materials of the isocyanate composition. As understood by one of ordinary skill in the art, a hydroxyl material includes molecules that contain at least one active hydrogen. In certain embodiments, polyols are the functional materials used to react with the components of the isocyanate composition. Polyols provide urethane linkages when reacted with an isocyanate-functional component, such as a polyisocyanate.

In some embodiments, the hydroxyl composition comprises: a) one or more non-fluorinated polyols and b) one or more fluorinated alcohols. For simplicity "polyols" or "hydroxyl-functional materials" would be used in this disclosure to refer to the nonfluorinated polyols. In certain embodiments, each of the polyol molecules has two or more hydroxyl moieties; wherein from 90% to 100% of the polyol molecules have two hydroxyl moieties each and from 0% to 10% of the polyol molecules have three or more hydroxyl moieties each. In other embodiments, from 95% to 100% of the polyol molecules have two hydroxyl moieties each and from 0% to 5% of the polyol molecules have three or more hydroxyl moieties each. In other embodiments, from 98% to 100% of the polyol molecules have two hydroxyl moieties each and from 0% to 2% of the polyol molecules have three or more hydroxyl moieties each. In other embodiments, 100% of the polyol molecules have two hydroxyl moieties with no polyol molecules having three or more hydroxyl moieties.

The one or more fluorinated alcohols can be mono functional (one hydroxyl moiety per molecule) or di-functional (two hydroxyl moieties per molecule). Fluorinated alcohols will be described in more detail in a separate section of this disclosure.

In one embodiment, suitable polyols used to prepare the coatings according to the present disclosure comprise short chain hydroxyl-functional compounds (12 or less carbon atoms), long chain hydroxyl-functional compounds (more than 12 carbon atoms), or combinations thereof. In some embodiments, the polyols are chosen from ☐☐☐☐ hydroxyl compounds (i.e. compounds comprising two terminal hydroxyl groups). In other embodiments, the polyols further comprise one or more oxyalkylene or polyoxyalkylene moieties.

Examples of polyols include dihydroxyl-compounds having a carbon chain of from 2 to 12 carbon atoms, or from 3 to 10, and from 4 to 8 carbon atoms. In some embodiments the carbon chain may be interrupted by one or more single oxygen atoms, while in other embodiments the carbon chain may not be interrupted. The polyols may be linear, cyclic or branched, although linear materials are preferred. The hydroxyl functional material includes compounds that may be selected from alkane diols, alkane ether diols, alkane polyether diols and alkane ester diols containing from about 2 to 12, preferably 3 to 12 carbon atoms. Such compounds are preferably α-ω diols. Preferably the diols are linear α-ω diols. Typical examples of short chain α-ω diols include but are not limited to 1,2-ethanediol, 1,3-propanediol, 1,4-butanediol, 1,5-pentane-diol, 1,6-hexanediol, 1,7-heptanediol, 1,8-octanediol and combinations thereof.

The carbohydrate chain linking the functional groups may be interrupted by one or more oxygen atoms. For example, suitable diols include diol ethers or diol polyethers and suitable esters may include oxyalkylene esters or polyoxyalkylene esters. Typically the isocyanate-reactive compounds have from 2 to 20, preferably 4 to 14, more preferably 6 to 12 carbon atoms, which may or may not be interrupted by one or more oxygen atoms. Alkane diols, alkane diol ethers and alkane diol polyethers are the preferred isocyanate-reactive compounds.

The hydroxyl-functional material may typically have a hydroxyl functionality of two, but, as mentioned above, other hydroxyl-functional materials with a functionality greater than 2, such as 3, 4, 5, or 6 can be present in the hydroxyl composition. Examples of such hydroxyl-functional materials include pentaerythritol, pentanetriol, and hexanetriol.

It is also understood that the hydroxyl-functional material may be present as blends or mixtures of diols. In case of such mixtures or blends of materials the molecular weight ranges may be average molecular weight ranges, for example number averaged molecular weight ranges or weight averaged molecular weight ranges, the latter being typically applied. In case of blends or mixtures of materials it is also understood that the diols provided may contain fractions of higher or lower alcohols. The OH— functionality of the high molecular weight hydroxyl-functional material may be an average value or may be a range for example, the OH functionality may be within the range of about 1.8 to about 2.2.

As mentioned above, it is understood that in addition to the compounds described above other hydroxyl-functionalized compounds, like for example hydroxyl-functionalized materials having a hydroxyl functionality of greater than 2 hydroxyl groups per molecule may be used.

Other Materials Capable of Reacting with the Isocyanate Composition

Those of ordinary skill in the polyurethane chemistry art will understand that a wide variety of materials are able to react with isocyanate functional materials. In some embodiments, non-hydroxy materials can be used to make polyurethane-based coatings of this disclosure as long as they contain reactive hydrogens that react with the isocyanate group of an isocyanate compound. In some embodiments, the reactive hydrogens are provided by functional groups like, for example, thiol groups and amino groups and are contemplated by the inventors as molecules that can be part of the hydroxyl composition. The non-hydroxy isocyanate-reactive compounds are typically bifunctional, preferably linear bifunctional compounds and include, for example, diamines, and amino esters. Amine-functionalized materials, for example, form urea units with isocyanate moieties.

The term polyurethane-based as used herein is meant to include the presence of other units including polymeric units other than urethane-units. In other embodiments, the hydroxyl composition predominantly contains the hydroxyl materials described in above. In some embodiments, at least 50%, or at least 60%, or at least 75%, or at least 90%, or at least 95%, by weight of the isocyanate-reactive material in the hydroxyl composition is made up of the hydroxyl materials described above).

Fluorinated Alcohol

The fluorinated alcohol comprises a fluorinated segment (Rf). In certain embodiments, it is preferred that the fluorinated segment of the fluorinated alcohol has a formula molecular weight of less than 1000 g/mole.

In some embodiments, the fluorinated alcohol has the formula (I):

$$Rf[X(OH)R1]_a \qquad (I)$$

wherein: X is an organic linking group;
Rf represents a monovalent or divalent perfluoroaliphatic group, comprising a (per)fluorinated alkyl or alkylene group, optionally in combination with perfluorinated polyalkyleneoxy groups consisting of perfluorinated alkyleneoxy groups having 1, 2, 3 or 4 carbon atoms or a mixture of such perfluorinated alkyleneoxy groups a is 1 or 2,
wherein, when a=1 then R1 is —OH or —H and,
wherein, when a=2 then R1 is H In one embodiment, the fluorinated alcohol is represented by the formula (II)

$$Rf_2-[O-(Rf_3)_t-Rf_4-X(OH)R1]_a \qquad (II)$$

wherein $Rf_2$ is a perfluorinated alkyl or a perfluorinated alkylene group, $Rf_3$ is a perfluorinated polyalkyleneoxy group comprising repeating units chosen from —($C_nF_{2n}$O)—, —(CF(Z)O)—, —(CF(Z)$C_nF_{2n}$O)—, —($C_nF_{2n}$CF(Z)O)—, —($CF_2$CF(Z)O)— and combinations thereof, wherein Z is a perfluoroalkyl group; n is an integer from 1 to 4; Rf4 is a perfluorinated alkylene group; t is 0 to 13, with the proviso that the formula weight of the fluorinated segment $Rf_2$—[O—(Rf$_3$)$_t$-Rf$_4$—]$_a$ is lower than 1000 g/mole and X(OH)R1 is selected from $(CH_2)_s$—OH and —C(O)N(R2)-$(CH_2)_s$OH, wherein s is an integer from 1 to 4, a is 1 or 2, and R2 is H or ($C_1$-$C_{20}$) alkyl.

In one embodiment, structures for a divalent perfluoropolyether group $Rf_2$-[(O—$Rf_3$—($Rf_4$)]$_2$ in Formula (II) include —$CF_2$O($CF_2$O)$_m$($C_2F_4$O)$_p$$CF_2$—, wherein m is 0 to 13 and for p is 0 to 7 with the proviso that m and p are not simultaneously 0. In another embodiment, $Rf_2$-[(O—$Rf_3$—($Rf_4$)]$_2$— in Formula (II) is —CF($CF_3$)O(CF[$CF_3$]$CF_2$O)$_p$CF($CF_3$)—, wherein p is 0 to 5. In another embodiment, $Rf_2$[(O—$Rf_3$—($Rf_4$)]$_2$— in Formula (II) is —$CF_2$O($C_2F_4$O)$_p$$CF_2$— wherein p is 0 to 8. In another embodiment, $Rf_2$—[(O—$Rf_3$—($Rf_4$)]$_2$— in Formula (II) is —($CF_2$)$_3$($C_4F_8$O)$_p$($CF_2$)$_3$—, wherein p has a value of 0 to 3. In another embodiment, $Rf_2$[(O—$Rf_3$—($Rf_4$)]$_2$— in Formula (II) is —CF($CF_3$)(O$CF_2$[$CF_3$]CF)$_p$O($CF_2$)$_m$O(CF[$CF_3$]$CF_2$O)$_p$CF($CF_3$)—, wherein p is 1 or 2 and m is 1 to 8. In certain embodiments, particularly preferred structures of $Rf_2$[(O—$Rf_3$—($Rf_4$)]$_2$ are —$CF_2$O($CF_2$O)$_m$$C_2F_4$O)$_p$$CF_2$—, —$CF_2$O($C_2F_4$O)$_p$$CF_2$—, and —CF($CF_3$)(O$CF_2$[$CF_3$]CF)$_p$O($CF_2$)$_m$O(CF[$CF_3$]$CF_2$O)$_p$CF($CF_3$)—. It is to be understood that the formula weight of $Rf_2$—[(O—$Rf_3$—($Rf_4$)]$_2$— in Formula (II) in all of the embodiments disclosed in this paragraph is lower than 1000 g/mole.

In one embodiment, structures for a monovalent perfluoropolyether group $Rf_2$[(O—$Rf_3$—($Rf_4$)]— in Formula (II), include $CF_3$$CF_2$O($CF_2$O)$_m$($C_2F_4$O)$_p$$CF_2$— wherein m is 0 to 12 and for p is 0 to 7. In another embodiment, $Rf_2$—[(O—$Rf_3$—($Rf_4$)]— in Formula (II) is $CF_3$$CF_2$O($C_2F_4$O)$_p$$CF_2$— wherein p is 0 to 7. In another embodiment, $Rf_2$—[(O—$Rf_3$—($Rf_4$)]— in Formula (II) is $CF_3$O($CF_2$O)$_m$($C_2F_4$O)$_p$$CF_2$— wherein m is 0 to 13 and for p is 0 to 7. In another embodiment, $Rf_2$—[(O—$Rf_3$—($Rf_4$)]— in Formula (II) is $CF_3$$CF_2$$CF_2$O(CF[$CF_3$]$CF_2$O)$_p$CF($CF_3$)— wherein p is 0 to 4, or combinations thereof. It is to be understood that the formula weight of $Rf_2$—[(O—$Rf_3$—($Rf_4$)]— in Formula (II) in all of the embodiments disclosed in this paragraph is lower than 1000 g/mole.

In other embodiments, the fluorinated alcohol is chosen from $C_4F_9$—$SO_2$—N(no space between N and H or other groups)H—$CH_2$$CH_2$—OH, $C_4F_9$—$SO_2$—N($CH_3$)—$CH_2$$CH_2$—OH, $C_4F_9$—$SO_2$—N($CH_2$$CH_3$)—$CH_2$$CH_2$—OH, $C_4F_9$—$SO_2$—N($CH_2$$CH_2$—OH)$_2$, $C_3F_7$—$CH_2$—OH, $C_3F_7$—C(O)—NH—$CH_2$$CH_2$—OH, $C_3F_7$—C(O)—N($CH_3$)—$H_2$$CH_2$—OH, $C_3F_7$—C(O)—N($CH_2$$CH_3$)—$CH_2$$CH_2$—OH, $C_3F_7$—C(O)—N($CH_2$$CH_2$—OH)$_2$, $C_6F_{13}$—$CH_2$$CH_2$—OH, $C_5F_{11}$—C(O)—NH—$CH_2$$CH_2$—OH, $C_5F_{11}$—C(O)—N($CH_3$)—$CH_2$$CH_2$—OH, $C_5F_{11}$—C(O)—N($CH_2$$CH_3$)—$CH_2$$CH_2$—OH, $C_5F_{11}$—C(O)—N($CH_2$$CH_2$—OH)$_2$HO$CH_2$$CF_2$O$C_2F_4$O($CF_2$)$_4$O$C_2F_4$OC$F_2$$CH_2$OH, HO$CH_2$$CF_2$$CF_2$O($CF_2$)$_4$OC$F_2$$CF_2$$CH_2$OH, $C_4F_9$$CH_2$$CH_2$OH, $CF_3$OC$F_2$OC$F_2$$CF_2$OC$F_2$CONHC$H_2$$CH_2$OH, HOC$H_2$$CH_2$$C_4F_8$$CH_2$$CH_2$OH, and HOC$H_2$$CH_2$OC$F_2$OC$F_2$OC$F_2$$CF_2$OC$F_2$OC$H_2$$CH_2$OH, and combinations thereof.

In other embodiments, the fluorinated alcohol is a fluoroalkyl sulfonamide alcohol of the formula (III):

(III)

wherein: n is an integer from 1 to 16;
u is an integer from 1 to 20;
v is an integer from 1 to 20; and
R3 is —OH or —H In other embodiments, the fluorinated alcohol is a fluoroalkyl sulfonamide diol of the formula (IV), which corresponds to a fluoroalkyl sulfonamide diol of the formula (III) in which R3 is OH:

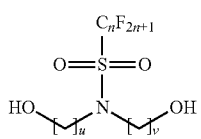

(IV)

wherein: n is an integer from 1 to 16;
u is an integer from 1 to 20; and
v is an integer from 1 to 20

In other embodiments, the fluoro diol is a fluoroalkyl sulfonamide diol of formula (IV), wherein u is an integer from 1 to 6 and v is an integer from 1 to 6.

In other embodiments, the fluoro diol is a fluoroalkyl sulfonamide diol of formula (IV), wherein n is an integer from 1 to 6.

In other embodiments, the fluoro diol is chosen from $C_4F_9$—$SO_2$—$N(CH_2CH_2$—$OH)_2$ and $C_6F_{13}$—$SO_2$—$N(CH_2CH_2$—$OH)_2$, and combinations thereof.

In other embodiments, the fluoro diol is a fluoro diol of formula (IV), wherein the sulfonamide moiety in the formula has been replaced with a carboxamido moiety. In other embodiments, the fluoro diol is chosen from $C_3F_7$—C(O)—$N(CH_2CH_2$—$OH)_2$ and $C_5F_{11}$—C(O)—$N(CH_2CH_2$—$OH)_2$. In other embodiments, the fluoro diol is a fluoro diol of formula (IV), wherein the —$SO_2$— moiety in the formula is replaced with —$CH_2CH_2$.

In certain embodiments, the fluorinated alcohol is present in an amount form 0.1% to 2% by weight with respect to the total weight of the two-part composition. In other embodiments, the fluorinated alcohol is present in an amount from 2% to 20% by weight with respect to the total weight of the hydroxyl composition, or from 3% to 15% by weight with respect to the total weight of the hydroxyl composition, or from 4% to 12% by weight with respect to the total weight of the hydroxyl composition, or from 5% to 10% by weight with respect to the total weight of the hydroxyl composition.

Isocyanate Composition

The isocyanate-reactive materials of the hydroxyl composition are reacted with the isocyanate-functional component of the isocyanate composition during the formation of the polyurethane-based coatings described herein.

The isocyanate-functional component may contain one isocyanate-functional material or mixtures thereof. The isocyanate material comprises a polyisocyanate. Polyisocyanates have at least two isocyanate-functional groups, typically at the terminal position of the molecule. They provide urethane linkages (or urethane-like linkages) when reacted with the hydroxyl groups (or other isocyanate-reactive materials as described above) of hydroxyl composition.

The polyisocyanates are typically diisocyanates or comprise diisocyanates. In some embodiments, from 90% to 100% of the polyisocyanates molecules have two isocyanate moieties each and from 0% to 10% of the polyisocyanate molecules have three or more isocyanate moieties each. In other embodiments, from 95% to 100% of the polyisocyanate molecules have two isocyanate moieties each and from 0% to 5% of the polyisocyanate molecules have three or more isocyanate moieties each. In other embodiments, from 98% to 100% of the polyisocyanate molecules have two isocyanate moieties each and from 0% to 2% of the polyisocyanate molecules have three or more isocyanate moieties each. In other embodiments, from 99% to 100% of the polyisocyanate molecules have two isocyanate moieties each and from 0% to 1% of the polyisocyanate molecules have three or more isocyanate moieties each. In other embodiments, 100% of the polyisocyanate molecules have two isocyanate moieties each, with no polyisocyanate molecules having three or more isocyanate moieties.

The polyisocyanates are generally oligomeric isocyanates. Such oligomeric isocyanate-functional components are referred to in the art as "prepolymers". They may be obtained by the reaction of "diisocyanates" with isocyanate-reactive compounds. In one embodiment, the diisocyanates are used in molar excess over the isocyanate-reactive compounds to ensure that the resulting oligomer (prepolymer) has terminal isocyanate groups. The prepolymers preferably include one or more urethane linkages, i.e. the prepolymer can be obtained by the reaction of one or more polyisocyanates (typically diisocyanates) and a hydroxyl component (typically a diol). Preferably, the polyisocyanate prepolymer contains at least two urethane units. The at least two urethane units preferably are the reaction product of a linear aliphatic diisocyanate and an isocyanate-reactive compound.

The isocyanate-functional compounds typically are diisocyanates, preferably aliphatic diisocyanates. Suitable aliphatic diisocyanates are preferably linear and include diisocyanates having from 3 to 20 carbon atoms, and more preferably from 6 to 12 carbon atoms, for example, but not limited to, hexamethylene diisocyanate, heptamethylene diisocyanate, octamethylene diisocyanate, nonamethylene diisocyanate. That is, the polyisocyanate prepolymer is obtainable by a reaction of one or more (preferably linear) diisocyanates as described above with one or more preferably linear isocyanate-reactive compounds as described above. For example, preferred substantially linear polyisocyanate prepolymers include isocyanate terminated reaction products obtainable by the reaction of linear diisocyanates having from 3 to 20 carbon atoms with linear diols, diol ether or diol polyethers having from 3 to 20 carbon atoms. The resulting prepolymers are substantially linear. For example, the prepolymers may be represented by the general formula

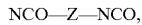

NCO—Z—NCO, wherein Z is a linking group comprising at least two urethane (—NH—CO—O—) units and additionally one or more, preferably repeating, units selected from alkylenes, oxyalkylenes, polyoxyalkylenes, alkylene esters, oxyalkylene esters, polyoxyalkylene esters and combinations thereof.

In some embodiments, the polyisocyanates are chosen from 1,6 hexamethylene diisocyanate, 2,2,4-trimethyl-1,6-hexamethylenediisocyanate, 1,2-ethylenediisocyanate, dicyclohexylmethane-4,4'-diisocyanate, 3-isocyanatomethyl-3,5,5-trimethylcyclohexylisocyanate and their prepolymers.

Typically, the polyisocyanate prepolymers have a molecular weight of from about 600 to about 4,000 g/mole, preferably from about 800 to about 2,000 g/mole. Preferably the prepolymer has an equivalent weight of from about 200 to about 600. The isocyanate-functional material may typically have an isocyanate functionality of 2, but, as mentioned above, other isocyanate-functional materials with a functionality greater than 2, such as 3, 4, 5, or 6 can be present in the isocyanate composition.

Typically, the prepolymer has a viscosity from about 1500 up to about 10,000, preferably up to about 8,000 mPa·s at 25° C. (DIN EN ISO 3219/A.3).

Typical examples of useful prepolymers are commercially available, for example form Bayer MaterialScience LLC under the trade designation DESMODUR and MONDUR and the VORANATE series from Dow Plastics, a business group of the Dow Chemical Company.

Additives

The isocyanate-reactive component and/or the isocyanate-functional component may comprise further ingredients to modify the resulting coating or, for example, to influence the curing time and pot life of the reactive compositions. Typical additives include but are not limited to fillers, pigments, stabilizers, catalysts, pot life-enhancing agents, dehumidifiers etc. Unless otherwise explicitly indicated, the additives can be added either to the isocyanate composition or to the hydroxyl composition.

Typical examples of fillers include inorganic particles including but not limited to silica, such as fumed silica, glass or ceramic beads/bubbles, fibers (e.g., glass, metal, inorganic, or organic fibers). Fillers may be used in low amounts and generally may not exceed 10% or 5% by weight based on the total weight of the reactive composition or coating.

Other typical additives include pigments. Preferably the amount of pigments is less than 20% by weight of the reactive composition or coating. In some embodiments the compositions are essentially free of pigments. Essentially free means the composition contain no pigments or in amounts that still lead to a transparent coating (e.g. amounts of less than 1% by weight based on the weight of the reactive composition/coating). Such coatings are typically transparent. This may be advantageous because rotor blades, in particular those of great dimensions contain warning colors, typically a pattern of red and white. The protective coating is typically applied as the outermost coating and a transparent coating may thus not interfere with the warning colors on the blade.

Pigments are typically metal oxides or carbon particles and include, for example, black pigments like carbon particles (including but not limited to carbon black, acetylene black, soot, carbon nanotubes), white pigments (including but not limited to zinc oxides, titanium oxides, such as titanium dioxide), red pigments (including but not limited to iron oxides, lead oxides).

In one embodiment, one or more UV stabilizers are added to the two-part composition, for example, to prevent yellowing of the materials. In some embodiments, the UV stabilizers are chosen from zinc oxides, preferably zinc oxide nanoparticles, hydroxyphenyl triazines, hydroxyphenyl benzotriazoles and hydroxy benzophenones and are typically added to the hydroxyl composition. In some embodiments, the UV stabilizers are chosen from Tinuvin 400 (hydroxyphenyl-triazine), Tinuvin 1130 (hydroxyphenyl benzotriazole), Chimassorb 90 (hydroxybenzophenone), and combinations thereof, and are present in the hydroxyl composition.

In other embodiments, the UV stabilizers are sterically hindered amines. Such amines are not reactive with the isocyanate-functional component. Such sterically hindered and inert amines are known in the art as HALS (Hindered Amine Light Stabilizers). Typical examples of HALS are described for instance in US 2002/0161123 A1 to Li et al. HALS are commercially available, for example under the trade designation TINUVIN from Ciba Speciality Chemicals, Switzerland. UV stabilizers may be added typically in amounts of up to about 20% by weight based on reactive composition/coating. In some embodiments, the UV stabilizers are chosen from Tinuvin 123 and Tinuvin 292.

In some embodiments, the reactive compositions may preferably contain catalysts to accelerate the curing reaction. Catalysts for the polymerization reaction between the reactive components may be included in the compositions as known in the art for preparing polyurethanes. Typical examples include lead, tin, bismuth, zinc and zirconium compounds, for instance zirconium chelate compounds (other than pigments). Typical amounts of catalysts include up to 1% by weight based on the total precursor composition (i.e. the combined reactive components) or the coating composition. To increase the pot life so-called pot life enhancers may be added. These compounds include complexing agents that form weak and reversible complexes with the catalysts. The weak complex between pot-life enhancer and catalyst may be broken up by oxygen or water molecules airborne humidity. This way the pot-life is increased because the curing reaction is slowed down until the weak complex between catalyst and pot-life enhancer is broken up by ambient oxygen or humidity. Pot-life enhancers include but are not limited to carboxylic acids or acetylated ketones, like acetylacetone.

Other typical additives include dehumidifiers (e.g. but not limited to molecular sieves), antimicrobial agents, flame retardants etc.

Two-Part Polyurethane Compositions

In certain embodiments, the additives may be added to the isocyanate-functional materials to form a blend or a dispersion. In other embodiments, the additives may be added to the isocyanate-reactive materials to form a blend or a dispersion, in some instances, under vacuum. In other embodiments, certain inorganic additives, such as titanium dioxide or carbon black particles are added to the isocyanate-reactive materials.

In other embodiments, either the isocyanate composition or the hydroxyl composition have solvents. Solvents are typically hydrocarbons or functional hydrocarbons that have a melting point below 15° C. and a boiling point of less than 120° C. Examples of solvents include aromatics like toluene or xylene; ketones, such as cyclohexanone, methyl ethyl ketone, methyl isobutyl ketone, esters like methoxy propyl acetate, butyl acetate, ethylacetate.

The two-part polyurethane coatings provided herein are curable at room temperature. The term curable as used herein means that the material can polymerize. In some embodiments, it is preferred that no cross-linking occurs. In fact, in certain embodiments, the cured composition may contain exclusively or predominantly linear polymers. The compositions typically have a pot time of greater than 1 minute and typically less than 10 minutes. The pot time is the time at which the compositions remain coatable or pourable after combining or mixing the isocyanate composition and the hydroxyl composition. The compositions are curable at room temperature, which means the reaction of the reactive components starts at room temperature but curing may be accelerated at elevated temperatures.

Preparation of Precursor Coating Compositions and Coatings

In general, compositions comprising the isocyanate-reactive and isocyanate-functional components, along with the optional additives, are combined to form a coating precursor composition. Typically the ratios of isocyanate-reactive to isocyanate-functional components are chosen such that the equivalent ratio of isocyanate-groups of the isocyanate-functional material to isocyanate-reactive groups, typically hydroxyl groups, of the isocyanate-reactive material is about 1:1 to about 1.5:1. Typically the ratio is from about 1:1 to about 1.2:1.

The coating composition (i.e. the reactive composition or coating precursor) typically has a viscosity at room temperature of from about 1000 to about 5000 mPas. This viscosity allows the material to be applied to the substrate for example by painting, brushing, or spray coating, roller coating or coating using coating knives. The precursor composition is typically applied to the substrate and then allowed to cure forming a polyurethane-based polymer composition as the reaction product of the isocyanate-reactive and the isocyanate-functional components.

Application of Coating Composition

In one embodiment the coating composition is applied using a structured film. In this embodiment the reactive-composition is applied to the surface, for example the leading edge of a rotor blade, and is then (subsequently or simultaneously) distributed along the surface using the structured surface of a structured film. The structured film may be part of a coating tool for manual application or part of an automated process, for example involving a coating robot. The structured film is typically made of a flexible material that allows the structured surface of the structured film to be bent around (and ideally following) the surface to be coated, which in one embodiment, is the leading edge of a rotor blade and thus is a curved surface.

The structured film may be (releasably) attached to the application device and can be replaced after use. The application device may contain a means suitable to bend the structured film around the curved surface to be coated and to maintain it in that position to provide contact of the structured surface of the film with the surface to be coated or with the coating composition on that surface. Such means may include mechanical means, for example spring-driven mechanism or clamps, pneumatic, pressure-controlled, magnetic or electrical means. The connection may also be achieved by adhesion or using hook-and-loop mechanisms.

The structured film may also or additionally be attached to or be part of a foamed substrate providing sufficient buffering capacity to allow the structured film to maintain contact with the curved surface to be coated.

The structured surface of the structured film will be exposed to the reactive composition. In some embodiments, the structure of this surface contains a pattern of raised and non-raised areas that allows an uninterrupted pathway of the reactive composition to flow from one edge of the structured surface to its other edge, typically the opposed edge. In certain embodiments, the structured surface is moved along the coating direction and the structured pattern is thus oriented to allow the flow of the reactive composition in that direction. The pattern can be generated by any suitable means and arrangements.

Typically, the pattern may involve continuous grooves or a pattern of pins. The pattern may be symmetric or asymmetric. The pattern should provide a pathway that is wide enough for the coating composition to flow through but should allow the gaps created in the reactive coating composition by wiping the structured surface over the reactive composition to be refilled by the coating composition after the wiping movement has been completed. The depth of the pattern may be adjusted to the desired thickness of the coating. A coating thickness of between 150 and 500 µm can be achieved using a pattern having grooves of a depth of from at least about 300 µm, typically between 300 µm and 1500 µm. The grooves may have a width of from about 300 µm to about 1,500 µm. In case the pattern is created by an arrangement of knobs or pins, the depth and width of the grooves is replaced by the distance between the knobs or pin and their heights, respectively. While the structured film is desirably flexible such that it can be bent around a curved surface like a leading edge, it is not required that the structure surface of the film be made up of flexible materials. Structured films as described herein can be prepared by known methods in the art including but not limited to laser ablation, embossing, and others. Materials made as described in WO 2012006207 to Hitschmann and Kuehneweg may also be used.

The structured films with the dimension described above may be applicable to provide smooth and homogeneous coatings for coating compositions having a typical viscosity of 1000 mPas to 5000 mPas like the precursor compositions described herein. By using the structured films the coating compositions may be applied to the rotor blades in a manual or an automated process.

Substrates

Typical substrates onto which the coating is applied or formed include polymeric resins, like fiber-reinforced polymeric resin. Typical substrates include but are not limited to rotor blades, and may also include train underfloors, and portions of the fuselage or a wing of an aircraft. In the case of rotor blades, certain embodiments, are directed to rotor blades for wind turbines, and preferably wind turbines of off-shore wind power plants but may also include rotor blades of aircrafts like helicopters. The coatings may be conveniently applied to rotor blades having a length (as their greatest dimension) of at least 30 m or at least 50 m or at least 90 m. Typically, the coating is applied to the leading edge of the rotor blade.

Other embodiments of the present disclosure are directed to coatings comprising the cured two-part compositions disclosed herein. Other embodiments are directed to coated articles comprising a coating comprising the cured two-part composition. In some embodiments, the article is chosen from a wind turbine blade, a helicopter rotor blade, a train underfloor, and a portion of the fuselage or a wing of an aircraft.

The coatings provided herein may also be used in combination with protective tapes, for example to smoothen the edge formed by a protective tape. In such applications the coatings may be referred to as "edge fillers". Edges, for example from protective films or tapes applied to leading edges of rotor blades, may be big enough to have a negative impact on the aerodynamics. Applying the coating to such edges may soften the edge formed by the tape and provide more favorable aerodynamics.

A thickness of from about 200 to about 500 µm of the coating may be sufficient to provide significant protection from erosion and/or icing or to improve the aerodynamic impact when used as edge filler.

In some embodiments, the coatings provided herein are used as top coats, that is the coatings are the outermost layer of the substrate, i.e. they are typically the outermost layer of the rotor blade.

Methods

Other embodiments of the present disclosure are directed to methods of reducing erosion in an article. Such methods may comprise:

providing a two-part composition as described in this application, mixing the two-part composition, coating the article with the two-part composition, and curing the coating.

Other embodiments are directed to methods, wherein the article is chosen from a wind turbine blade, a train underfloor, and a portion of the fuselage or a wing of an aircraft.

EXAMPLES

The following examples and specific embodiments are provided to further illustrate the present disclosure. These lists are provided for illustrative purposes and are not intended to limit the disclosure to the examples and embodiments provided. All parts are parts by weight unless otherwise specified.

Test Methods

Elongation at Break and Tensile Strength at Break

Cured polyurethane films were tested for elongation at break and tensile strength at break according to ASTM D882-10, using a Zwick tensile tester (available from Zwick GmbH, Germany) using a head speed of 40 mm/s. Measurements were made on 4×25 mm test samples having a thickness as indicated in the examples. Peak tensile strength (EMod) and tensile strength at break (F@break) are recorded in MPa, tensile elongation at break (E@break) is given in %. All values are the averages of at least 2 measurements.

Tear Resistance

The Tear Resistance was measured according to DIN ISO 34-1 (Jan. 7, 2005), method A (Trouser specimen), using a Zwick tensile tester (available from Zwickel GmbH, Germany) using a head speed of 100 mm/min. Measurements were made on 4×25 mm test samples having a thickness as indicated in the examples. Average force Fmiddle Lm, Fmin Lmand Fmax Lm are recorded in N; the tear resistance Ts is recorded in N/mm. All values are the averages of at least 2 measurements.

Rain Erosion Test

The anti-erosion properties were measured with the rain erosion test method according to ASTM G73-10. For this test, polyurethane coating compositions were casted onto three 225 mm long test specimen, simulating the leading edge of wind turbine blades. The thickness of the coatings was about 300 μm. The coatings were cured under different conditions as outlined below:

Two of the three coated test profiles were placed directly in a constant climate room at 50% RH and 23° C. for seven days.

The other coated test profile was placed in a climate chamber at 80% RH and 23° C. for 24 h and then 6 days in the climate room at 50% RH and 23° C.

The cured coatings were then subjected to the rain erosion test. The test profiles were mounted on the blades of a rotor, which was rotated to provide a speed ranging from test velocity of 160 m/s at the tip of the blades to a test velocity of 143 m/s in the center and 126 m/s at root.

Rainfall was simulated by spraying water (23° C.), having a droplet size of about 2 mm, with a velocity of 30 mm/hour onto the rotating blades inside the rig.

The test was stopped every 30 minutes after which the coated surfaces were visually inspected. The test was run during 18 hours, unless otherwise indicated.

Abbreviations

Since we removed the details of the additives, the details in the abbreviations can also be deleted, I think.

DESMOPHEN 1400BT: trifunctional polyether polyol, available from Bayercoatings.

DESMODUR E305: linear aliphatic NCO prepolymer based on hexamethylene diisocyanate, available from Bayer MaterialScience DESMODUR XP 2617: largely linear aliphatic NCO prepolymer based on hexamethylene diisocyanate, available from Bayer MaterialScience FBSEE: $C_4F_9SO_2N(C_2H_4OH)_2$ a fluorochemical diol, can be prepared as described in Example 8 of U.S. Pat. No. 3,787,351 (Olson), except that an equimolar amount of $C_4F_9SO_2NH_2$ is substituted for $C_8F_{17}SO_2NH_2$.

Examples 1 to 3 and Comparative Examples C-1 to C-3

In examples 1 to 3 and comparative examples C-1 to C-3, two part polyurethane coatings were prepared having a composition as given in table 1.

In a first step, a blend of 1,4-butanediol with FBSEE was prepared by placing 200 parts 1,4-butanediol into a 3-neck glass flask equipped with a mechanical stirrer, heating mantle, Pt100 thermocouple and nitrogen inlet. The 1,4-butanediol was heated to 95° C. under nitrogen atmosphere while stirring at 200 rpm. 20 parts FBSEE at 90-95° C. was added and the mixture was stirred for 30 minutes. The mixture was then cooled to RT to obtain a clear solution without any sediment or insoluble particles.

The Part A (hydroxyl composition) of examples 1 to 3 and comparative example C-3 was prepared by mixing the above prepared blend with the other ingredients, in amounts as listed in table 1, using a high speed mixer (Speed Mixer DAC 150, 1 FVZ, available from Hausschild GmbH & Co KG). The compositions were mixed and grinded until the pigment particle size reduced to less than about 5 μm (as measured with a grindometer available from Byk Gardner)

The Part A of comparative examples C-1 and C-2, without fluorinated diol, were prepared by directly mixing 1,4-butane diol with the other ingredients, without heating.

In all cases Part B (isocyanate composition) was prepared by mixing catalyst and DESMODUR 305E or DESMODUR XP2617 as given in table 1.

Prior to making a coating, Part A and Part B were mixed for 30 sec in a speed mixer. The coating compositions were coated onto two polypropylene (PP) plates using a Meyer bar coater (available from Byk Gardner). Directly after coating, one plate was placed directly into a constant climate chamber at 50% RH and 23° C. during seven days. The other plate was first placed into a constant climate chamber at 80% RH and 23° C. during 24 h, followed by 6 days in a climate chamber at 50% RH and 23° C.

In both cases, i.e. after 7 day total curing time, the coatings were pulled from the PP plates to provide free films. The cured films were tested for elongation at break and tensile strength at break and for tear resistance according to the test methods given above. The results are listed in tables 2 and 3.

TABLE 1

Composition examples 1 to 3 and comparative examples C-1 and C-2

| Compounds (in parts by weight) | Ex 1 | Ex 2 | Ex 3 | Comparative example C-1 | Comparative example C-2 | Comparative example C-3 |
|---|---|---|---|---|---|---|
| PART A ||||||||
| FBSEE | 0.5 | 1 | 1 | 0 | 0 | 1 |
| 1,4-BUTANE-DIOL | 10.0 | 10.0 | 10.0 | 10.0 | 10.0 | 10.0 |
| Additives | 30.2 | 30.2 | 32.95 | 30.2 | 30.2 | 30.2 |

TABLE 1-continued

Composition examples 1 to 3 and comparative examples C-1 and C-2

| Compounds (in parts by weight) | Ex 1 | Ex 2 | Ex 3 | Comparative example C-1 | Comparative example C-2 | Comparative example C-3 |
|---|---|---|---|---|---|---|
| PART B | | | | | | |
| DESMODUR E 305 | 77.4 | 78.3 | 0 | 76.5 | 101.1 | 102.8 |
| DESMODUR XP 2617 | 0 | 0 | 77.3 | 0 | 0 | 0 |
| Catalyst | 1.2 | 1.2 | 1.2 | 1.2 | 1.2 | 1.2 |

TABLE 2

Elongation and tensile strength

| Ex | Thickness (mm) | EMod (MPA) | F@Break (MPA) | E@break (%) |
|---|---|---|---|---|
| Curing 7 d 23° C./50% RH | | | | |
| Ex 1 | 0.194 | 208.03 | 29.97 | 662.44 |
| Ex 2 | 0.269 | 219.20 | 35.17 | 738.69 |
| Ex 3 | 0.483 | 187.13 | 28.29 | 720.17 |
| C-2 | 0.240 | 170.50 | 26.83 | 766.23 |
| C-3 | 0.250 | 169.84 | 26.21 | 743.22 |
| Curing 24 h 23° C./80% RH, followed by 6 d 23° C./50% RH | | | | |
| Ex 1 | 0.267 | 232.09 | 22.51 | 603.59 |
| Ex 2 | 0.193 | 243.39 | 20.79 | 585.73 |
| Ex 3 | 0.545 | 177.48 | 26.97 | 738.32 |
| C-1 | | Not measurable, no cure | Not measurable, no cure | Not measurable, no cure |
| C-2 | 0.237 | 152.68 | 13.21 | 577.60 |
| C-3 | 0.262 | 165.67 | 15.95 | 590.67 |

TABLE 3

Tear resistance test

| Ex | Thickness (mm) | Fmiddle Lm (N) | Fmin Lm (N) | Fmax Lm (N) | Ts (N/mm) |
|---|---|---|---|---|---|
| Curing 7 d 23° C./50% RH | | | | | |
| Ex 1 | 0.215 | 13.18 | 12.38 | 13.59 | 62.27 |
| Ex 2 | 0.268 | 17.18 | 16.23 | 17.68 | 64.14 |
| Ex 3 | 0.427 | 31.26 | 28.79 | 32.32 | 72.98 |
| C-2 | 0.266 | 12.95 | 11.82 | 14.01 | 48.71 |
| C-3 | 0.288 | 13.47 | 12.14 | 14.87 | 46.91 |
| Curing 24 h 23° C./80% RH, followed by 6 d 23° C./50% RH | | | | | |
| Ex 1 | 0.330 | 21.72 | 20.73 | 22.38 | 65.81 |
| Ex 2 | 0.202 | 11.27 | 10.33 | 11.47 | 55.97 |
| Ex 3 | 0.416 | 18.94 | 17.44 | 19.79 | 44.74 |
| C-1 | | Not measurable, no cure | Not measurable, no cure | Not measurable, no cure | Not measurable, no cure |
| C-2 | 0.254 | 12.69 | 11.53 | 13.37 | 50.03 |
| C-3 | 0.285 | 14.37 | 13.19 | 15.29 | 50.45 |

Comparative Example C-4

Comparative example C-4 was made by replacing the FBSEE from example 1 with 0.4 parts $C_3F_7O(C_3F_6O)_nCF(CF_3)CONHCH_2CH_2OH$ (with n~5.4 and a formula weight of about 1250). No stable part A could be made. This fluorinated alcohol was not compatible with 1,4-butanediol, resulting in phase separation.

Rain Erosion Test

Figure 2:
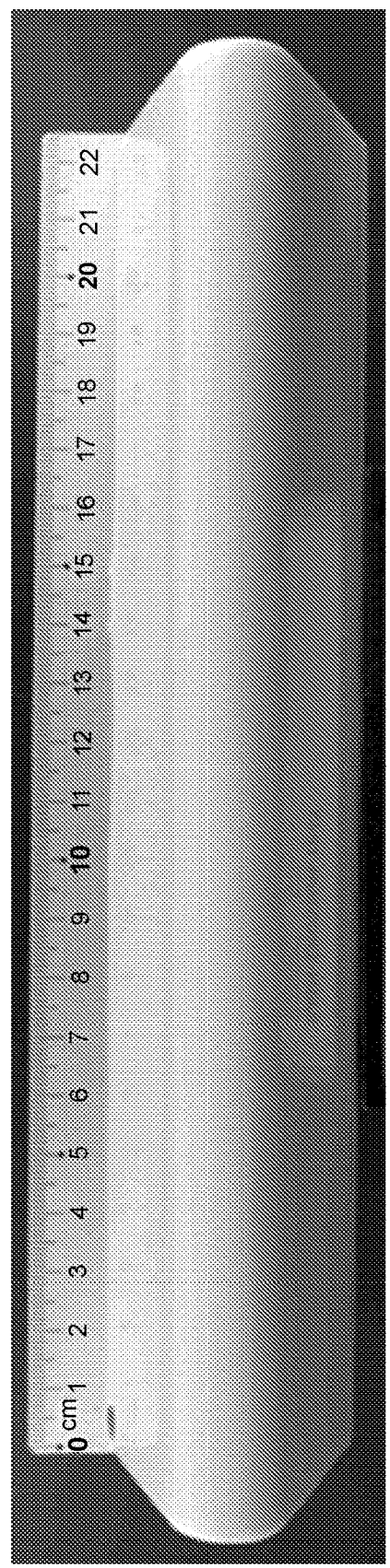
FIG. 2 is a picture showing the results of a rain erosion test (18 h) on a specimen coated with the coating from Example 3, cured at 50% RH and 23° C. for 7 days.

The rain erosion test as described above was performed with Example 3 and Comparative Examples C-2 and C-3. No erosion could be observed for Example 3 (i.e. no break through of the coating observed), when cured 7 d at 23° C. with 50% RH or cured 24 h at 23° C. with 80% RH, followed by 6 d at 23° C. with 50% RH. In both cases, the test was discontinued after 18 hours. FIG. 1 shows the results of the rain erosion test for the coating of Example 3, cured at 80% RH and 23° C. for 24 h and then 6 days at 50% RH and 23° C. FIG. 2 shows the results of the rain erosion test for the coating from Example 3, cured at 50% RH and 23° C. for 7 days.

Figure 3:
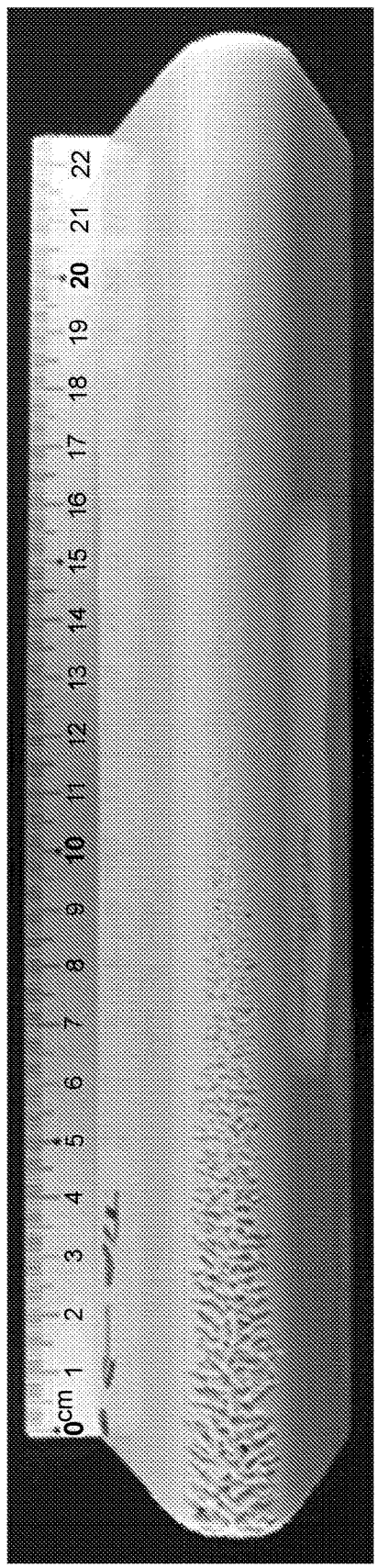
FIG. 3 is a picture showing the results of a rain erosion test (9 h) on a specimen coated with the coating from Comparative Example 3 (crosslinked coating), cured at 80% RH and 23° C. for 24 h followed by 6 days at 50% RH and 23° C.
Figure 4:
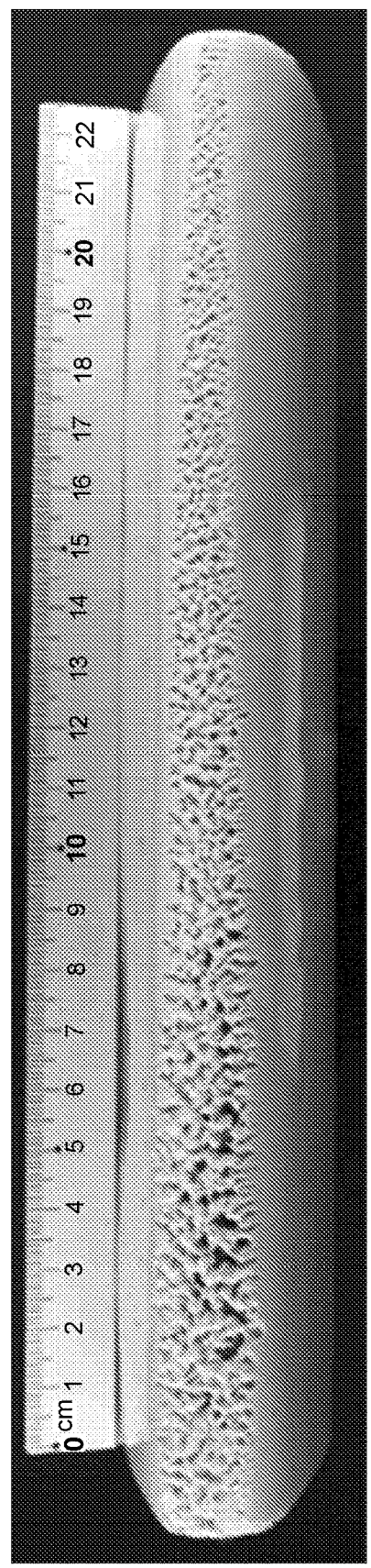
FIG. 4 is a picture showing the results of a rain erosion test (5 h) on a specimen coated with the coating from Comparative Example 2 (crosslinked coating), cured at 80% RH and 23° C. for 24 h followed by 6 days at 50% RH and 23° C.

On the other hand, break through of the coating and severe erosion was observed already after 5 hours test for Comparative Example C-2, or 9 hours test for Comparative Example C-3 when cured 24 h at 23° C. with 80% RH, followed by 6d at 23° C. with 50% RH. The test was discontinued after 5 or 9 hours respectively. FIG. 3 shows the results of the rain erosion test for the coating from Comparative Example 3 (crosslinked coating), cured at 80% RH and 23° C. for 24 h followed by 6 days at 50% RH and 23° C. FIG. 4 shows the results of a rain erosion test for the coating from Comparative Example 2 (crosslinked coating), cured at 80% RH and 23° C. for 24 h followed by 6 days at 50% RH and 23° C.

Exemplary Embodiments

1. A two-part composition comprising:
   an isocyanate composition comprising polyisocyanate molecules, each molecule having two or more isocyanate moieties;
   wherein from 95% to 100% of the polyisocyanate molecules have two isocyanate moieties each and from 0% to 5% of the polyisocyanate molecules have three or more isocyanate moieties each; and
   a hydroxyl composition comprising:
   polyol molecules, each molecule having two or more hydroxyl moieties; wherein from 95% to 100% of the polyol molecules have two hydroxyl moieties each and from 0% to 5% of the polyol molecules have three or more hydroxyl moieties each; and
   a fluorinated alcohol comprising a fluorinated segment, wherein the fluorinated segment (Rf) has a formula molecular weight of less than 1000 g/mole; wherein the fluorinated alcohol has the formula:

Rf[X(OH)R1]$_a$ wherein: X is an organic linking group;
   Rf represents a monovalent or divalent perfluoroaliphatic group, comprising a (per)fluorinated alkyl or alkylene group, optionally in combination with perfluorinated polyalkyleneoxy groups consisting of perfluorinated alkyleneoxy groups having 1, 2, 3 or 4 carbon atoms or a mixture of such perfluorinated alkyleneoxy groups a is 1 or 2,
   wherein, when a=1 then R1 is —OH or —H and,
   wherein, when a=2 then R1 is H and
   wherein the two-part composition, when mixed, coated on a substrate, and cured, has a rain erosion resistance longer than 9 hours measured according to method ASTM G73-10 using a coating of about 300 μm.

2. The two-part composition according to embodiment 1, wherein the two-part composition, when mixed, cured, and made into a free film, forms a polyurethane film having an elongation at break point higher than 300% according to method ASTM D882-10, and measured on a film having a thickness of 300 μm to 500 μm.

3. The two-part composition according to any of the preceding embodiments, wherein Rf is $Rf_2-[(O-Rf_3-(Rf_4)]_t$ and X(OH)R1 is chosen from $-(CH_2)_s-OH$ and $-C(O)N(R2)-(CH_2)_sOH$, wherein:
  $Rf_2$ is a perfluorinated alkyl or a perfluorinated alkylene group,
  $Rf_3$ is a perfluorinated polyalkyleneoxy group comprising repeating units chosen from $-(C_nF_{2n}O)-$, $-(CF(Z)O)-$, $-(CF(Z)C_nF_{2n}O)-$, $-(C_nF_{2n}CF(Z)O)-$, $-(CF_2CF(Z)O)-$ and combinations thereof,
    wherein Z is a perfluoroalkyl group;
    n is an integer from 1 to 4
  Rf4 is a perfluorinated alkylene group;
  t is 1 or 2,
  s is an integer from 1 to 4, and
  R2 is H or $(C_1-C_{20})$ alkyl.

4. The two-part composition according to any of the preceding embodiments, wherein t is 2, and $Rf_2[(O-Rf_3-(Rf_4)]_2$ is $-CF_2O(CF_2O)_m(C_2F_4O)_pCF_2-$, wherein:
  m is 0 to 13, and
  p is 0 to 7,
  with the proviso that m and p are not simultaneously 0 and the formula weight of $-CF_2O(CF_2O)_m(C_2F_4O)_pCF_2-$ is lower than 1000 g/mole.

5. The two-part composition according to any of the preceding embodiments, wherein t is 2, and $Rf_2-[(O-Rf_3-(Rf_4)]_2-$ is $-CF(CF_3)O(CF[CF_3]CF_2O)_pCF(CF_3)-$, wherein:
  p is 0 to 5, and
  the formula weight of $-CF(CF_3)O(CF[CF_3]CF_2O)_pCF(CF_3)-$ is lower than 1000 g/mole.

6. The two-part composition according to any of the preceding embodiments, wherein t is 2, and $Rf_2-[(O-Rf_3-(Rf_4)]_2-$ is $-(CF_2)_3O(C_4F_8O)_p(CF_2)_3-$, wherein:
  p is 0 to 3, and
  the formula weight of $-(CF_2)_3O(C_4F_8O)_p(CF_2)_3-$ is lower than 1000 g/mole.

7. The two-part composition according to any of the preceding embodiments, wherein t is 1, and $Rf_2-[(O-Rf_3-(Rf_4)]-$ is $CF_3CF_2O(CF_2O(CF_2O)_m(C_2F_4O)_pCF_2-$, wherein:
  m is 0 to 12,
  p is 0 to 7, and
  the formula weight of $CF_3CF_2O(CF_2O)_m(C_2F_4O)_pCF_2-$ is lower than 1000 g/mole.

8. The two-part composition according to any of the preceding embodiments, wherein t is 1, and $Rf_2-[(O-Rf_3-(Rf_4)]-$ is $CF_3CF_2O(C_2F_4O)_pCF_2-$, wherein:
  p is 0 to 7, and
  the formula weight of $CF_3CF_2O(C_2F_4O)_pCF_2-$ is lower than 1000 g/mole.

9. The two-part composition according to any of the preceding embodiments, wherein t is 1, and $Rf_2-[(O-Rf_3-(Rf_4)]-$ is $CF_3O(CF_2O)_m(C_2F_4O)_pCF_2-$, wherein:
  m is 0 to 13,
  p is 0 to 7, and
  the formula weight of $CF_3O(CF_2O)_m(C_2F_4O)_pCF_2-$ is lower than 1000 g/mole.

10. The two-part composition according to any of the preceding embodiments, wherein t is 1, and $Rf_2-[(O-Rf_3-(Rf_4)]-$ is $CF_3CF_2CF_2O(CF[CF_3]CF_2O)_pCF(CF_3)-$, wherein:
  p is 0 to 4, and
  the formula weight of $CF_3CF_2CF_2O(CF[CF_3]CF_2O)_pCF(CF_3)-$ is lower than 1000 g/mole.

11. The two-part composition according to any of the preceding embodiments, wherein Rf[X(OH)R1]a is $Rf1(SO_2-N[R2]_p[(CH_2)_r-OH]_q)b$,
  wherein: Rf1 is a monovalent or divalent (per)fluorinated alkyl or alkylene group having at least 3 carbon atoms,
  R2 is H or $(C_1-C_{20})$ alkyl,
  b is 1 or 2,
    when b=1 then p is 0 or 1 and q is 1 or 2, provided that p+q=2;
    when b=2, then p is 1 and q is 1 and
  r is an integer from 1 to 20.

12. The two-part composition according to embodiment 11, wherein Rf1 is a monovalent or divalent (per)fluorinated alkyl or alkylene group having from 3 to 20 carbon atoms.

13. The two-part composition according to embodiment 11, wherein b is 1, p is 0, q is 2, and r is an integer from 1 to 6.

14. The two-part composition according to embodiment 11, wherein b is 1, p is 1, q is 1, and r is an integer from 1 to 6.

15. The two-part composition according to embodiment 1, wherein Rf[X(OH)R1]a is $Rf1[C(O)-N[R2]_p-[CH_2]_r-OH]_{q]b}$,
  wherein: Rf1 is a monovalent or divalent(per)fluorinated alkyl or alkylene group having at least 3 carbon atoms,
  R2 is H or $(C_1-C_{20})$ alkyl,
  b is 1 or 2, when b=1 then
  p is 0 or 1 and q is 1 or 2, provided that p+q=2;
  when b=2, then p is 1 and q is 1 and
  r is an integer from 1 to 20.

16. The two-part composition according to embodiment 15, wherein Rf1 is a monovalent or divalent(per)fluorinated alkyl or alkylene group having from 3 to 20 carbon atoms.

17. The two-part composition according to embodiment 15, wherein b is 1, p is 0, q is 2, and r is an integer from 1 to 6.

18. The two-part composition according to embodiment 15, wherein b is 1, p is 1, q is 1, and r is an integer from 1 to 6.

19. The two-part composition according to any of the preceding embodiments, wherein R2 is H or $(C_1-C_6)$ alkyl.

20. The two-part composition according to embodiment 1, wherein Rf[X(OH)R1]a is $Rf_2-[(O-Rf_3-(Rf_4)]_t[X(OH)R1]_a$
  wherein Rf2 is a perfluorinated alkyl or alkylene group,
  Rf3 is a perfluorinated polyalkyleneoxy group comprising repeating units chosen from $-(C_nF_{2n}O)-$, $-(CF(Z)O)-$, $-(CF(Z)C_nF_{2n}O)-$, $-(C_nF_{2n}CF(Z)$ O)—, —(CF$_2$CF(Z)O)— and combinations thereof, wherein Z is a perfluoroalkyl group;
Rf4 is a perfluorinated alkylene group
t is 1 or 2 and s is an integer from 1 to 4, wherein X(OH)R1 is selected from (CH$_2$)$_s$—OH and —C(O)N(R2)-(CH$_2$)$_s$OH,
wherein R1 is —OH or —H, and R2 is H or (C$_1$-C$_{20}$) alkyl 21. The two-part composition according to embodiment 20, wherein Z is a perfluoroalkyl group having from 1 to 9 carbon atoms.

22. The two-part composition according to embodiment 1, wherein R1 is H and X is chosen from —CH—, —CH$_2$CH—, —SO$_2$—N(Me)CH$_2$CH— and —C(O)—N(Me)CH$_2$CH—.

23. The two-part composition according to embodiment 1, wherein the fluorinated alcohol is chosen from C$_4$F$_9$—SO$_2$—NH—CH$_2$CH$_2$—OH, C$_4$F$_9$—SO$_2$—N(CH$_3$)—CH$_2$CH$_2$—OH, C$_4$F$_9$—SO$_2$—N(CH$_2$CH$_3$)—CH$_2$CH$_2$—OH, C$_4$F$_9$—SO$_2$—N(CH$_2$CH$_2$—OH)$_2$, C$_3$F$_7$—CH$_2$—OH, C$_3$F$_7$—C(O)—NH—CH$_2$CH$_2$—OH, C$_3$F$_7$—C(O)—N(CH$_3$)—CH$_2$CH$_2$—OH, C$_3$F$_7$—C(O)—N(CH$_2$CH$_3$)—CH$_2$CH$_2$—OH, C$_3$F$_7$—C(O)—N(CH$_2$CH$_2$—OH)$_2$, C$_6$F$_{13}$—CH$_2$CH$_2$—OH, C$_5$F$_{11}$—C(O)—NH—CH$_2$CH$_2$—OH, C$_5$F$_{11}$—C(O)—N(CH$_3$)—CH$_2$CH$_2$—OH, C$_5$F$_{11}$—C(O)—N(CH$_2$CH$_3$)—CH$_2$CH$_2$—OH, C$_5$F$_{11}$—C(O)—N(CH$_2$CH$_2$—OH)$_2$HOCH$_2$CF$_2$OC$_2$F$_4$O(CF$_2$)$_4$OC$_2$F$_4$OCF$_2$CH$_2$OH, HOCH$_2$CF$_2$CF$_2$O(CF$_2$)$_4$OCF$_2$CF$_2$CH$_2$OH, C$_4$F$_9$CH$_2$CH$_2$OH, CF$_3$OCF$_2$OCF$_2$CF$_2$OCF$_2$CONHCH$_2$CH$_2$OH, HOCH$_2$CH$_2$C$_4$F$_8$CH$_2$CH$_2$OH, and HOCH$_2$CH$_2$OCF$_2$OCF$_2$OCF$_2$CF$_2$OCF$_2$OCH$_2$CH$_2$OH, and combinations thereof.

24. The two-part composition according to any of the preceding embodiments, wherein n is an integer from 1 to 6.

25. The two-part composition according to any of the preceding embodiments, wherein from 98% to 100% of the polyisocyanate molecules have two isocyanate moieties each and from 0% to 2% of the polyisocyanate molecules have three or more isocyanate moieties each.

26. The two-part composition according to any of the preceding embodiments, wherein from 99% to 100% of the polyisocyanate molecules have two isocyanate moieties each and from 0% to 1% of the polyisocyanate molecules have three or more isocyanate moieties each.

27. The two-part composition according to any of the preceding embodiments, wherein the polyisocyanate molecules are aliphatic diisocyanates.

28. The two-part composition according to any of the preceding embodiments, wherein the polyisocyanate molecules are chosen from 1,6 hexamethylene diisocyanate, 2,2,4-trimethyl-1,6-hexamethylenediisocyanate, 1,2-ethylenediisocyanate, dicyclohexylmethane-4,4'-diisocyanate, 3-isocyanatomethyl-3,5,5-trimethylcyclohexylisocyanate and their prepolymers.

29. The two-part composition according to any of the preceding embodiments, wherein from 98% to 100% of the polyol molecules have two hydroxyl moieties each and from 0% to 2% of the polyol molecules have three or more hydroxyl moieties each.

30. The two-part composition according to any of the preceding embodiments, wherein from 99% to 100% of the polyol molecules have two hydroxyl moieties each and from 0% to 1% of the polyol molecules have three or more hydroxyl moieties each.

31. The two-part composition according to any of the preceding embodiments, wherein the polyol molecules are chosen from linear aliphatic diols.

32. The two-part composition according to any of the preceding embodiments, wherein the polyol molecules are chosen from propanediol, butanediol, pentanediol, hexanediol, heptanediol, and octanediol.

33. The two-part composition according to any of the preceding embodiments, wherein the polyol molecules having three or more hydroxyl moieties are chosen from pentaerythritol, pentanetriol, and hexanetriol.

34. The two-part composition according to any of the preceding embodiments, wherein the elongation at break point is higher than 400%.

35. The two-part composition according to any of the preceding embodiments, wherein the elongation at break point is higher than 450%.

36. The two-part composition according to any of the preceding embodiments, wherein the elongation at break point is higher than 500%.

37. The two-part composition according to any of the preceding embodiments, wherein the elongation at break point is higher than 550%.

38. The two-part composition according to any of the preceding embodiments, wherein the elongation at break point is higher than 600%.

39. The two-part composition according to any of the preceding embodiments, wherein the elongation at break point is higher than 700%.

40. The two-part composition according to any of the preceding embodiments, wherein the elongation at break point is higher than 300% when the two-part composition is cured at a temperature of 23° C. and relative humidity of 60%.

41. The two-part composition according to any of the preceding embodiments, wherein the elongation at break point is higher than 300% when the two-part composition is cured at a temperature of 23° C. and relative humidity of 65%.

42. The two-part composition according to any of the preceding embodiments, wherein the elongation at break point is higher than 300% when the two-part composition is cured at a temperature of 23° C. and relative humidity of 70%.

43. The two-part composition according to any of the preceding embodiments, wherein the elongation at break point is higher than 300% when the two-part composition is cured at a temperature of 23° C. and relative humidity of 75%.

44. The two-part composition according to any of the preceding embodiments, wherein the elongation at break point is higher than 300% when the two-part composition is cured at a temperature of 23° C. and relative humidity of 80%.

45. The two-part composition according to any of the preceding embodiments, further comprising TiO$_2$, carbon black particles, or both in the hydroxyl composition.

46. The two-part composition according to any of the preceding embodiments, further comprising one or more UV stabilizers chosen from zinc oxides, hydroxyphenyl triazines, hydroxyphenyl benzotriazoles and hydroxy benzophenones in the isocyanate and/or the hydroxyl composition.

47. The two-part composition according to any of the preceding embodiments, wherein the zinc oxide is in the form of zinc oxide nanoparticles.

48. The two-part composition according to any of the preceding embodiments, further comprising Hindered Amine Light Stabilizers (HALS).
49. The two-part composition according to any of the preceding embodiments, further comprising a curing catalyst in the hydroxyl composition.
50. The two-part composition according to any of the preceding embodiments, wherein the fluorinated alcohol is present in an amount form 0.1% to 2% by weight with respect to the total weight of the two-part composition.
51. The two-part composition according to any of the preceding embodiments, wherein the fluorinated alcohol is present in an amount from 2% to 20% by weight with respect to the total weight of the hydroxyl composition.
52. The two-part composition according to any of the preceding embodiments, wherein the fluorinated alcohol is present in an amount from 3% to 15% by weight with respect to the total weight of the hydroxyl composition.
53. The two-part composition according to any of the preceding embodiments, wherein the fluorinated alcohol is present in an amount from 4% to 12% by weight with respect to the total weight of the hydroxyl composition.
54. The two-part composition according to any of the preceding embodiments, wherein the fluorinated alcohol is present in an amount from 5% to 10% by weight with respect to the total weight of the hydroxyl composition.
55. The two-part composition according to any of the preceding embodiments, wherein the two-part composition, when mixed, cured, and made into a free film, forms a polyurethane film having a tear resistance from 35 N/mm to 75 N/mm, measured according to DIN ISO 34-1 (Jan. 7, 2005), method A (Trouser specimen).
56. The two-part composition according to any of the preceding embodiments, wherein the two-part composition, when mixed, cured, and made into a free film, forms a polyurethane film having a tear resistance from 45 N/mm to 75 N/mm, measured according to DIN ISO 34-1 (Jan. 7, 2005), method A (Trouser specimen).
57. The two-part composition according to any of the preceding embodiments, wherein the two-part composition, when mixed, cured, and made into a free film, forms a polyurethane film having a tear resistance from 55 N/mm to 75 N/mm, measured according to DIN ISO 34-1 (Jan. 7, 2005), method A (Trouser specimen).
58. The two-part composition according to any of the preceding embodiments, wherein the two-part composition, when mixed, cured, and made into a free film, forms a polyurethane film having a tensile strength at break from 16 MPa to 40 MPa, measured according to ASTM D882-10.
59. The two-part composition according to any of the preceding embodiments, wherein the two-part composition, when mixed, cured, and made into a free film, forms a polyurethane film having a tensile strength at break from 16 MPa to 35 MPa, measured according to ASTM D882-10.
60. The two-part composition according to any of the preceding embodiments, wherein the two-part composition, when mixed, cured, and made into a free film, forms a polyurethane film having a tensile strength at break from 20 MPa to 35 MPa, measured according to ASTM D882-10.
61. The two-part composition according to any of the preceding embodiments, wherein the two-part composition, when mixed, cured, and made into a free film, forms a polyurethane film having a tensile strength at break from 25 MPa to 35 MPa, measured according to ASTM D882-10.
62. The two-part composition according to any of the preceding embodiments, wherein the two-part composition, when mixed, cured, and made into a free film, forms a polyurethane film capable of being dissolved in acetone.
63. The two-part composition according to any of the preceding embodiments, wherein the free film was cured at a temperature of 23° C. and relative humidity of 60%.
64. The two-part composition according to any of the preceding embodiments, wherein the free film was cured at a temperature of 23° C. and relative humidity of 65%.
65. The two-part composition according to any of the preceding embodiments, wherein the free film was cured at a temperature of 23° C. and relative humidity of 70%.
66. The two-part composition according to any of the preceding embodiments, wherein the free film was cured at a temperature of 23° C. and relative humidity of 75%.
67. The two-part composition according to any of the preceding embodiments, wherein the free film was cured at a temperature of 23° C. and relative humidity of 80%.
68. The two-part composition according to any of the preceding embodiments, wherein the coating on the substrate was cured at a temperature of 23° C. and relative humidity higher than 60%.
69. The two-part composition according to any of the preceding embodiments, wherein the coating on the substrate was cured at a temperature of 23° C. and relative humidity higher than 65%.
70. The two-part composition according to any of the preceding embodiments, wherein the coating on the substrate was cured at a temperature of 23° C. and relative humidity higher than 70%.
71. The two-part composition according to any of the preceding embodiments, wherein the coating on the substrate was cured at a temperature of 23° C. and relative humidity higher than 75%.
72. The two-part composition according to any of the preceding embodiments, wherein the coating on the substrate was cured at a temperature of 23° C. and relative humidity higher than 80%.
73. The two-part composition according to any of the preceding embodiments, wherein the rain erosion resistance is longer than 10 hours.
74. The two-part composition according to any of the preceding embodiments, wherein the rain erosion resistance is longer than 11 hours.
75. The two-part composition according to any of the preceding embodiments, wherein the rain erosion resistance is longer than 12 hours.
76. The two-part composition according to any of the preceding embodiments, wherein the rain erosion resistance is longer than 13 hours.
77. The two-part composition according to any of the preceding embodiments, wherein the rain erosion resistance is longer than 14 hours.

78. The two-part composition according to any of the preceding embodiments, wherein the rain erosion resistance is longer than 15 hours.
79. The two-part composition according to any of the preceding embodiments, wherein the rain erosion resistance is longer than 16 hours.
80. The two-part composition according to any of the preceding embodiments, wherein the rain erosion resistance is longer than 17 hours.
81. The two-part composition according to any of the preceding embodiments, wherein the rain erosion resistance is longer than 18 hours.
82. A coating comprising the cured two-part composition according to any of the preceding embodiments.
83. A coated article comprising a coating comprising the cured two-part composition according to any of the preceding embodiments.
84. A coated article according to embodiment 83, wherein the article is chosen from a wind turbine blade, a helicopter rotor blade, a train underfloor, and a portion of the fuselage or a wing of an aircraft.
85. A method of reducing erosion in an article comprising:
providing the two-part composition of any of embodiments 1 to 81,
mixing the two-part composition,
coating the article with the two-part composition, and
curing the coating.
86. The method of reducing erosion of any of the preceding embodiments directed to methods, wherein the article is chosen from a wind turbine blade, a train underfloor, and a portion of the fuselage or a wing of an aircraft.
87. A fluorinated alcohol-containing two-part polyurethane composition comprising:
an isocyanate composition comprising polyisocyanate molecules, each molecule having two or more isocyanate moieties;
wherein from 95% to 100% of the polyisocyanate molecules have two isocyanate moieties each and from 0% to 5% of the polyisocyanate molecules have three or more isocyanate moieties each; and
a hydroxyl composition comprising:
polyol molecules, each molecule having two or more hydroxyl moieties;
wherein from 95% to 100% of the polyol molecules have two hydroxyl moieties each and from 0% to 5% of the polyol molecules have three or more hydroxyl moieties each; and
a fluoroalkyl sulfonamide alcohol of the formula:

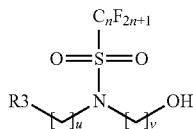

wherein: n is an integer from 1 to 16;
u is an integer from 1 to 20;
v is an integer from 1 to 20, and
R3 is —OH or —H,
wherein the two-part composition, when mixed, coated on a substrate, and cured, has a rain erosion resistance longer than 9 hours measured according to method ASTM G73-10 using a coating of 300 μm.

88. The fluorinated alcohol-containing two-part composition according to embodiment 87 wherein the two-part composition, when mixed, cured, and made into a free film, forms a polyurethane film having an elongation at break point higher than 300% according to method ASTM D882 10 and measured on a film having a thickness of 300 μm to 500 μm.
89. The fluorinated alcohol-containing two-part composition according to embodiment 87, wherein the sulfonamide moiety in the formula is replaced with a carboxamido moiety.
90. The fluorinated alcohol-containing two-part composition according to embodiment 87, wherein the —SO$_2$-moiety in the formula is replaced with —CH$_2$CH$_2$—.
91. A fluorinated alcohol-containing two-part polyurethane composition comprising:
an isocyanate composition comprising polyisocyanate molecules, each molecule having two or more isocyanate moieties;
wherein from 95% to 100% of the polyisocyanate molecules have two isocyanate moieties each and from 0% to 5% of the polyisocyanate molecules have three or more isocyanate moieties each; and
a hydroxyl composition comprising:
polyol molecules, each molecule having two or more hydroxyl moieties;
wherein from 95% to 100% of the polyol molecules have two hydroxyl moieties each and from 0% to 5% of the polyol molecules have three or more hydroxyl moieties each; and
a fluoroalkyl sulfonamide diol of the formula:

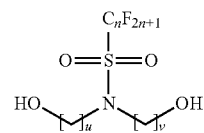

wherein: n is an integer from 1 to 16;
u is an integer from 1 to 20;
v is an integer from 1 to 20, and
wherein the two-part composition, when mixed, coated on a substrate, and cured, has a rain erosion resistance longer than 9 hours measured according to method ASTM G73-10 using a coating of 300 μm.
92. The fluorinated alcohol-containing two-part composition according to embodiment 91 wherein the two-part composition, when mixed, cured, and made into a free film, forms a polyurethane film having an elongation at break point higher than 300% according to method ASTM D882 10 and measured on a film having a thickness of 300 μm to 500 μm.
93. The fluorinated alcohol-containing two-part composition according to embodiment 91, wherein the sulfonamide moiety in the formula is replaced with a carboxamido moiety.
94. The fluorinated alcohol-containing two-part composition according to embodiment 91, wherein the —SO$_2$-moiety in the formula is replaced with —CH$_2$CH$_2$—.
95. The fluorinated alcohol-containing two-part composition according to embodiment 91, wherein the fluoroalkyl sulfonamide diol is C$_4$F$_9$—SO$_2$—N(CH$_2$CH$_2$—OH)$_2$, C$_3$F$_7$—C(LO)—N(CH$_2$CH$_2$—

OH)$_2$, C$_5$F$_{11}$—C(O)—N(CH$_2$CH$_2$—OH)$_2$, HOCH$_2$CH$_2$—C$_4$F$_8$—CH$_2$CH$_2$—OH, and combinations thereof.

96. The fluorinated alcohol-containing two-part composition according to any of the preceding embodiments directed to a fluorinated alcohol-containing two-part composition, wherein the two-part composition, when mixed, cured, and made into a free film, forms a polyurethane film having an elongation at break point higher than 300% according to method ASTM D882-10, and measured on a film having a thickness of 300 μm to 500 μm 97. The fluorinated alcohol-containing two-part composition according to any of the preceding embodiments directed to a fluorinated alcohol-containing two-part composition, wherein u is an integer from 1 to 6 and v is an integer from 1 to 6.

98. The fluorinated alcohol-containing two-part composition according to any of the preceding embodiments directed to a fluorinated alcohol-containing two-part composition, wherein n is an integer from 1 to 6

99. The fluorinated alcohol-containing two-part composition according to any of the preceding embodiments directed to a fluorinated alcohol-containing two-part composition wherein from 98% to 100% of the polyisocyanate molecules have two isocyanate moieties each and from 0% to 2% of the polyisocyanate molecules have three or more isocyanate moieties each.

100. The fluorinated alcohol-containing two-part composition according to any of the preceding embodiments directed to a fluorinated alcohol-containing two-part composition wherein from 99% to 100% of the polyisocyanate molecules have two isocyanate moieties each and from 0% to 1% of the polyisocyanate molecules have three or more isocyanate moieties each.

101. The fluorinated alcohol-containing two-part composition according to any of the preceding embodiments directed to a fluorinated alcohol-containing two-part composition, wherein the polyisocyanate molecules are aliphatic diisocyanates.

102. The fluorinated alcohol-containing two-part composition according to any of the preceding embodiments directed to a fluorinated alcohol-containing two-part composition, wherein the polyisocyanate molecules are chosen from 1,6 hexamethylene diisocyanate, 2,2,4-trimethyl-1,6-hexamethylenediisocyanate, 1,2-ethylenediisocyanate, dicyclohexylmethane-4,4'-diisocyanate, 3-isocyanatomethyl-3,5,5-trimethylcyclohexylisocyanate and their prepolymers.

103. The fluorinated alcohol-containing two-part composition according to any of the preceding embodiments directed to a fluorinated alcohol-containing two-part composition, wherein from 98% to 100% of the polyol molecules have two hydroxyl moieties each and from 0% to 2% of the polyol molecules have three or more hydroxyl moieties each.

104. The fluorinated alcohol-containing two-part composition according to any of the preceding embodiments directed to a fluorinated alcohol-containing two-part composition, wherein from 99% to 100% of the polyol molecules have two hydroxyl moieties each and from 0% to 1% of the polyol molecules have three or more hydroxyl moieties each.

105. The fluorinated alcohol-containing two-part composition according to any of the preceding embodiments directed to a fluorinated alcohol-containing two-part composition, wherein the polyol molecules are chosen from linear aliphatic diols.

106. The fluorinated alcohol-containing two-part composition according to any of the preceding embodiments directed to a fluorinated alcohol-containing two-part composition, wherein the polyol molecules are chosen from propanediol, butanediol, pentanediol, hexanediol, heptanediol, and octanediol.

107. The fluorinated alcohol-containing two-part composition according to any of the preceding embodiments directed to a fluorinated alcohol-containing two-part composition, wherein the polyol molecules having three or more hydroxyl moeities are chosen from pentaerythritol, pentanetriol, hexanetriol.

108. The fluorinated alcohol-containing two-part composition according to any of the preceding embodiments directed to a fluorinated alcohol-containing two-part composition, wherein the elongation at break point that is higher than 400%.

109. The fluorinated alcohol-containing two-part composition according to any of the preceding embodiments directed to a fluorinated alcohol-containing two-part composition, wherein the elongation at break point is higher than 450%.

110. The fluorinated alcohol-containing two-part composition according to any of the preceding embodiments directed to a fluorinated alcohol-containing two-part composition, wherein the elongation at break point is higher than 500%.

111. The fluorinated alcohol-containing two-part composition according to any of the preceding embodiments directed to a fluorinated alcohol-containing two-part composition, wherein the elongation at break point is higher than 550%.

112. The fluorinated alcohol-containing two-part composition according to any of the preceding embodiments directed to a fluorinated alcohol-containing two-part composition, wherein the elongation at break point is higher than 600%.

113. The fluorinated alcohol-containing two-part composition according to any of the preceding embodiments directed to a fluorinated alcohol-containing two-part composition, wherein the elongation at break point is higher than 700%.

114. The fluorinated alcohol-containing two-part composition according to any of the preceding embodiments directed to a fluorinated alcohol-containing two-part composition, wherein the elongation at break point is higher than 300% when the two-part composition is cured at a temperature of 23° C. and relative humidity of 60%.

115. The fluorinated alcohol-containing two-part composition according to any of the preceding embodiments directed to a fluorinated alcohol-containing two-part composition, wherein the elongation at break point is higher than 300% when the two-part composition is cured at a temperature of 23° C. and relative humidity of 65%.

116. The fluorinated alcohol-containing two-part composition according to any of the preceding embodiments directed to a fluorinated alcohol-containing two-part composition, wherein the elongation at break point is higher than 300% when the two-part composition is cured at a temperature of 23° C. and relative humidity of 70%.

117. The fluorinated alcohol-containing two-part composition according to any of the preceding embodiments directed to a fluorinated alcohol-containing two-part composition, wherein the elongation at break point is higher than 300% when the two-part composition is cured at a temperature of 23° C. and relative humidity of 75%.

118. The fluorinated alcohol-containing two-part composition according to any of the preceding embodiments directed to a fluorinated alcohol-containing two-part composition, wherein the elongation at break point is higher than 300% when the two-part composition is cured at a temperature of 23° C. and relative humidity of 80%.

119. The fluorinated alcohol-containing two-part composition according to any of the preceding embodiments directed to a fluorinated alcohol-containing two-part composition, further comprising $TiO_2$ or carbon black particles, or both in the hydroxyl composition.

120. The fluorinated alcohol-containing two-part composition according to any of the preceding embodiments directed to a fluorinated alcohol-containing two-part composition, further comprising one or more UV stabilizers chosen from zinc oxides, hydroxyphenyl triazines, hydroxyphenyl benzotriazoles and hydroxy benzophenones in the hydroxyl composition.

121. The fluorinated alcohol-containing two-part composition according to embodiment 120 directed to a fluorinated alcohol-containing two-part composition, wherein the zinc oxide is in the form of zinc oxide nanoparticles.

122. The fluorinated alcohol-containing two-part composition according to any of the preceding embodiments directed to a fluorinated alcohol-containing two-part composition, further comprising Hindered Amine Light Stabilizers (HALS).

123. The fluorinated alcohol-containing two-part composition according to any of the preceding embodiments directed to a fluorinated alcohol-containing two-part composition, further comprising a curing catalyst in the hydroxyl composition.

124. The fluorinated alcohol-containing two-part composition according to any of the preceding embodiments directed to a fluorinated alcohol-containing two-part composition, wherein the fluorinated alcohol is present in an amount from 0.1% to 2% by weight with respect to the total weight of the two-part composition.

125. The fluorinated alcohol-containing two-part composition according to any of the preceding embodiments directed to a fluorinated alcohol-containing two-part composition, wherein the fluorinated alcohol is present in an amount from 2% to 20% by weight with respect to the total weight of the hydroxyl composition.

126. The fluorinated alcohol-containing two-part composition according to any of the preceding embodiments directed to a fluorinated alcohol-containing two-part composition, wherein the fluorinated alcohol is present in an amount from 3% to 15% by weight with respect to the total weight of the hydroxyl composition.

127. The fluorinated alcohol-containing two-part composition according to any of the preceding embodiments directed to a fluorinated alcohol-containing two-part composition, wherein the fluorinated alcohol is present in an amount from 4% to 12% by weight with respect to the total weight of the hydroxyl composition.

128. The fluorinated alcohol-containing two-part composition according to any of the preceding embodiments directed to a fluorinated alcohol-containing two-part composition, wherein the fluorinated alcohol is present in an amount from 5% to 10% by weight with respect to the total weight of the hydroxyl composition.

129. The fluorinated alcohol-containing two-part composition according to any of the preceding embodiments directed to a fluorinated alcohol-containing two-part composition, wherein the two-part composition, when mixed, cured, and made into a free film, forms a polyurethane film having a tear resistance from 35 N/mm to 75 N/mm, measured according to DIN ISO 34-1 (Jan. 7, 2005), method A (Trouser specimen).

130. The fluorinated alcohol-containing two-part composition according to any of the preceding embodiments directed to a fluorinated alcohol-containing two-part composition, wherein the two-part composition, when mixed, cured, and made into a free film, forms a polyurethane film having a tear resistance from 45 N/mm to 75 N/mm, measured according to DIN ISO 34-1 (Jan. 7, 2005), method A (Trouser specimen).

131. The fluorinated alcohol-containing two-part composition according to any of the preceding embodiments directed to a fluorinated alcohol-containing two-part composition, wherein the two-part composition, when mixed, cured, and made into a free film, forms a polyurethane film having a tear resistance from 55 N/mm to 75 N/mm, measured according to DIN ISO 34-1 (Jan. 7, 2005), method A (Trouser specimen).

132. The fluorinated alcohol-containing two-part composition according to any of the preceding embodiments directed to a fluorinated alcohol-containing two-part composition, wherein the two-part composition, when mixed, cured, and made into a free film, forms a polyurethane film having a tensile strength at break from 16 MPa to 35 MPa, measured according to ASTM D882-10.

133. The fluorinated alcohol-containing two-part composition according to any of the preceding embodiments directed to a fluorinated alcohol-containing two-part composition, wherein the two-part composition, when mixed, cured, and made into a free film, forms a polyurethane film having a tensile strength at break from 16 MPa to 35 MPa, measured according to ASTM D882-10.

134. The fluorinated alcohol-containing two-part composition according to any of the preceding embodiments directed to a fluorinated alcohol-containing two-part composition, wherein the two-part composition, when mixed, cured, and made into a free film, forms a polyurethane film having a tensile strength at break from 20 MPa to 35 MPa, measured according to ASTM D882-10.

135. The fluorinated alcohol-containing two-part composition according to any of the preceding embodiments directed to a fluorinated alcohol-containing two-part composition, wherein the two-part composition, when mixed, cured, and made into a free film, forms a polyurethane film having a tensile strength at break from 25 MPa to 35 MPa, measured according to ASTM D882-10.

136. The fluorinated alcohol-containing two-part composition according to any of the preceding embodiments directed to a fluorinated alcohol-containing two-part composition, wherein the two-part composition, when mixed, cured, and made into a free film, forms a polyurethane film capable of being dissolved in acetone.

137. The fluorinated alcohol-containing two-part composition according to any of the preceding embodiments directed to a fluorinated alcohol-containing two-part composition, wherein the free film was cured at a temperature of 23° C. and relative humidity higher than 60%.

138. The fluorinated alcohol-containing two-part composition according to any of the preceding embodiments directed to a fluorinated alcohol-containing two-part composition, wherein the free film was cured at a temperature of 23° C. and relative humidity higher than 65%.

139. The fluorinated alcohol-containing two-part composition according to any of the preceding embodiments directed to a fluorinated alcohol-containing two-part composition, wherein the free film was cured at a temperature of 23° C. and relative humidity higher than 70%.

140. The fluorinated alcohol-containing two-part composition according to any of the preceding embodiments directed to a fluorinated alcohol-containing two-part composition, wherein the free film was cured at a temperature of 23° C. and relative humidity higher than 75%.

141. The fluorinated alcohol-containing two-part composition according to any of the preceding embodiments directed to a fluorinated alcohol-containing two-part composition, wherein the free film was cured at a temperature of 23° C. and relative humidity higher than 80%.

142. The fluorinated alcohol-containing two-part composition according to any of the preceding embodiments directed to a fluorinated alcohol-containing two-part composition, wherein the coating on the substrate was cured at a temperature of 23° C. and relative humidity higher than 60%.

143. The fluorinated alcohol-containing two-part composition according to any of the preceding embodiments directed to a fluorinated alcohol-containing two-part composition, wherein the coating on the substrate was cured at a temperature of 23° C. and relative humidity higher than 65%.

144. The fluorinated alcohol-containing two-part composition according to any of the preceding embodiments directed to a fluorinated alcohol-containing two-part composition, wherein the coating on the substrate was cured at a temperature of 23° C. and relative humidity higher than 70%.

145. The fluorinated alcohol-containing two-part composition according to any of the preceding embodiments directed to a fluorinated alcohol-containing two-part composition, wherein the coating on the substrate was cured at a temperature of 23° C. and relative humidity higher than 75%.

146. The fluorinated alcohol-containing two-part composition according to any of the preceding embodiments directed to a fluorinated alcohol-containing two-part composition, wherein the coating on the substrate was cured at a temperature of 23° C. and relative humidity higher than 80%.

147. The fluorinated alcohol-containing two-part composition according to any of the preceding embodiments directed to a fluorinated alcohol-containing two-part composition, wherein the rain erosion resistance is longer than 10 hours.

148. The fluorinated alcohol-containing two-part composition according to any of the preceding embodiments directed to a fluorinated alcohol-containing two-part composition, wherein the rain erosion resistance is longer than 11 hours.

149. The fluorinated alcohol-containing two-part composition according to any of the preceding embodiments directed to a fluorinated alcohol-containing two-part composition, wherein the rain erosion resistance is longer than 12 hours.

150. The fluorinated alcohol-containing two-part composition according to any of the preceding embodiments directed to a fluorinated alcohol-containing two-part composition, wherein the rain erosion resistance is longer than 13 hours.

151. The fluorinated alcohol-containing two-part composition according to any of the preceding embodiments directed to a fluorinated alcohol-containing two-part composition, wherein the rain erosion resistance is longer than 14 hours.

152. The fluorinated alcohol-containing two-part composition according to any of the preceding embodiments directed to a fluorinated alcohol-containing two-part composition, wherein the rain erosion resistance is longer than 15 hours.

153. The fluorinated alcohol-containing two-part composition according to any of the preceding embodiments directed to a fluorinated alcohol-containing two-part composition, wherein the rain erosion resistance is longer than 16 hours.

154. The fluorinated alcohol-containing two-part composition according to any of the preceding embodiments directed to a fluorinated alcohol-containing two-part composition, wherein the rain erosion resistance is longer than 17 hours.

155. The fluorinated alcohol-containing two-part composition according to any of the preceding embodiments directed to a fluorinated alcohol-containing two-part composition, wherein the rain erosion resistance is longer than 18 hours.

156. A coating comprising the fluorinated alcohol-containing two-part composition according to any of the preceding embodiments directed to a fluorinated alcohol-containing two-part composition.

157. A coated article comprising a coating comprising fluorinated alcohol-containing two-part composition according to any of the preceding embodiments directed to a fluorinated alcohol-containing two-part composition.

158. A coated article according to embodiment 157, wherein the article is chosen from a wind turbine blade, a train underfloor, and a portion of the fuselage or a wing of an aircraft.

159. A method of reducing erosion in an article comprising:
providing the two-part composition of any of embodiments 87 to 155,
mixing the two-part composition,
coating the article with the two-part composition, and
curing the coating.

160. The method of reducing erosion according to embodiment 159, wherein the article is chosen from a wind turbine blade, a helicopter rotor blade, a train underfloor, and a portion of the fuselage or a wing of an aircraft.

We claim:
1. A wind turbine blade having coated thereon a fluorinated alcohol-containing two-part polyurethane composition comprising:

an isocyanate composition comprising polyisocyanate molecules, each molecule having two or more isocyanate moieties;
  wherein from 95% to 100% of the polyisocyanate molecules have two isocyanate moieties each and from 0% to 5% of the polyisocyanate molecules have three or more isocyanate moieties each; and
a hydroxyl composition comprising:
  polyol molecules, each molecule having two or more hydroxyl moieties; wherein from 95% to 100% of the polyol molecules have two hydroxyl moieties each and from 0% to 5% of the polyol molecules have three or more hydroxyl moieties each; and
  a fluoroalkyl sulfonamide diol of the formula:

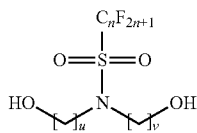

wherein:
  n is an integer from 1 to 16;
  u is an integer from 1 to 20;
  v is an integer from 1 to 20, and
wherein the two-part composition, when mixed, coated on a substrate, and cured, has a rain erosion resistance longer than 9 hours measured according to method ASTM G73-10 using a coating of 300 μm, and
wherein the elongation at break point is higher than 300% when the two-part composition is cured at a temperature of 23° C. and relative humidity of at least 60%.

2. The coated wind turbine blade according to claim 1 wherein the two-part composition, when mixed, cured, and made into a free film, forms a polyurethane film having an elongation at break point higher than 300% according to method ASTM D882 10 and measured on a film having a thickness of 300 μm to 500 μm.

3. The coated wind turbine blade according to claim 1, wherein the fluoroalkyl sulfonamide diol is $C_4F_9$—$SO_2$—$N(CH_2CH_2OH)_2$.

4. The coated wind turbine blade according to claim 1, wherein the polyisocyanate molecules are chosen from 1,6 hexamethylene diisocyanate, 2,2,4-trimethyl-1,6-hexamethylenediisocyanate, 1,2-ethylenediisocyanate, dicyclohexylmethane-4,4'-diisocyanate, 3-isocyanatomethyl-3,5,5-trimethylcyclohexylisocyanate and their prepolymers.

5. The coated wind turbine blade according to claim 1, wherein the polyol molecules are chosen from propanediol, butanediol, pentanediol, hexanediol, heptanediol, and octanediol.

6. The coated wind turbine blade according to claim 1, wherein the elongation at break point is higher than 300% when the two-part composition is cured at a temperature of 23° C. and relative humidity of at least 80%.

7. The coated wind turbine blade according to claim 1, further comprising $TiO_2$ or carbon black particles, or both in the hydroxyl composition.

8. The coated wind turbine blade according to claim 1, further comprising one or more UV stabilizers chosen from zinc oxides, hydroxyphenyl triazines, hydroxyphenyl benzotriazoles and hydroxy benzophenones in the hydroxyl composition.

9. The coated wind turbine blade according to claim 1, wherein the two-part composition, when mixed, cured, and made into a free film, forms a polyurethane film having a tear resistance from 35 N/mm to 75 N/mm, measured according to DIN ISO 34-1 (Jan. 7, 2005), method A (Trouser specimen).

10. The coated wind turbine blade according to claim 1, wherein the two-part composition, when mixed, cured, and made into a free film, forms a polyurethane film having a tensile strength at break from 16 MPa to 35 MPa, measured according to ASTM D882-10.

11. A method of reducing erosion of a wind turbine blade comprising:
  providing the two-part composition of claim 1,
  mixing the two-part composition,
  coating the wind turbine blade with the two-part composition, and
  curing the coating.

* * * * *

UNITED STATES PATENT AND TRADEMARK OFFICE
CERTIFICATE OF CORRECTION

PATENT NO. : 10,066,121 B2
APPLICATION NO. : 15/568037
DATED : September 4, 2018
INVENTOR(S) : Bjoern Weber It is certified that error appears in the above-identified patent and that said Letters Patent is hereby corrected as shown below:

In the Specification

Column 1,
Line 10, delete "62/152,195" and insert -- 62/152,295 --, therefor.

Column 5,
Line 62, delete "20" and insert -- 20. --, therefor.

Column 8,
Line 20, delete "□□□□" and insert -- α–ω --, therefor.

Column 9,
Line 53, delete "H" and insert -- H. --, therefor.

Column 10,
Line 5, delete "—$CF_{20}O$" and insert -- —$CF_2O$ --, therefor.
Line 10, delete "$RF_2$" and insert -- $RF_2$— --, therefor.
Line 12-13 (approx.), delete "—$(CF_2)_3(C_4F_8O)_p$" and insert -- —$(CF_2)_3O(C_4F_8O)_p$ --, therefor.
Line 14, delete "$RF_2$" and insert -- $RF_2$— --, therefor.
Line 18, delete "$RF_2$" and insert -- $RF_2$— --, therefor.
Line 26, delete "$RF_2$" and insert -- $RF_2$— --, therefor.
Line 45 (approx.), delete "$H_2C$" and insert -- $CH_2C$ --, therefor.

Column 11,
Line 4, delete "—H" and insert -- —H. --, therefor.
Line 21, delete "20" and insert -- 20. --, therefor.
Line 40, delete "form" and insert -- from --, therefor.

Column 13,
Line 46, delete "zink" and insert -- zinc --, therefor.

Signed and Sealed this
Seventh Day of May, 2019

Andrei Iancu
*Director of the United States Patent and Trademark Office*

Column 14,
Line 45, delete "ketone," and insert -- ketone; --, therefor.

Column 15,
Line 8, delete "mPas." and insert -- mPa· s. --, therefor.

Column 16,
Line 16 (approx.), delete "mPas" and insert -- mPa· s --, therefor.

Column 17,
Line 32, delete "Lmand" and insert -- Lm and --, therefor.
Line 67, delete "MaterialScience" and insert -- MaterialScience. --, therefor.

Column 18,
Line 3, delete "MaterialScience" and insert -- MaterialScience. --, therefor.
Line 27-28, delete "Hausschild" and insert -- Hauschild --, therefor.
Line 31, delete "Gardner)" and insert -- Gardner). --, therefor.

Column 20,
Line 21, delete "6d" and insert -- 6 d --, therefor.

Column 21,
Line 29-30 (approx.), delete "Rf$_2$[(O—Rf$_3$—(Rf$_4$)]$_2$" and insert -- Rf$_2$—[(O—Rf$_3$—(Rf$_4$)]$_2$— --, therefor.
Line 54, delete "(CF$_2$O(CF$_2$O)$_m$" and insert -- (CF$_2$O)$_m$ --, therefor.

Column 22,
Line 39-40, delete "—N [R2]$_p$—[CH$_2$)$_r$—OH]$_{q]b}$," and insert -- —N[R2]$_p$—[CH$_2$)$_r$—OH]$_q$]$_b$, --, therefor.

Column 23,
Line 8, delete "alkyl" and insert -- alkyl. --, therefor.

Column 25,
Line 9, delete "form" and insert -- from --, therefor.

Column 28,
Line 67, delete "C$_3$F$_7$—C(LO)—" and insert -- C$_3$F$_7$—C(O)— --, therefor.

Column 29,
Line 12, delete "μm" and insert -- μm. --, therefor.
Line 22, delete "6" and insert -- 6. --, therefor.

Column 30,
Line 15 (approx.), delete "moeities" and insert -- moieties --, therefor.

CERTIFICATE OF CORRECTION (continued)
U.S. Pat. No. 10,066,121 B2

In the Claims

Column 35,
Line 42, in Claim 3, delete "CH$_2$OH)$_2$." and insert -- CH$_2$—OH)$_2$. --, therefor.